(12) United States Patent
Iwamatsu

(10) Patent No.: US 6,236,263 B1
(45) Date of Patent: *May 22, 2001

(54) DEMODULATOR HAVING CROSS POLARIZATION INTERFERENCE CANCELING FUNCTION

(75) Inventor: Takanori Iwamatsu, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/962,052

(22) Filed: Oct. 31, 1997

(30) Foreign Application Priority Data

Jun. 19, 1997 (JP) .................................................. 9-162347

(51) Int. Cl.[7] .................................................. H04L 27/38
(52) U.S. Cl. .................. 329/306; 455/295; 455/296; 342/361; 375/349; 375/235; 329/304; 329/306; 329/310
(58) Field of Search ..................................... 455/304, 306, 455/295, 296; 375/235, 346, 349; 342/361; 329/304, 306, 309, 310

(56) References Cited

U.S. PATENT DOCUMENTS 4,606,054 * 8/1986 Amitay et al. .................... 455/306 X
5,838,740 * 11/1998 Kallman et al. ..................... 375/346

FOREIGN PATENT DOCUMENTS 9-51296    2/1997   (JP) .

* cited by examiner

Primary Examiner—Arnold Kinkead
(74) Attorney, Agent, or Firm—Helfgott & Karas, P.C.

(57) ABSTRACT

A demodulator with a cross polarization interference canceling function for canceling interference of cross polarization in the main polarization includes a demodulating unit for demodulating a baseband signal of the main polarization, a phase control unit which controls the phase of an interference signal, which is a baseband signal of cross polarization, based upon an error in the demodulated signal, and an interference cancellation unit which cancels an interference signal component from the demodulated signal of the main polarization.

9 Claims, 18 Drawing Sheets

ZERO AT ALL TAPS EXCEPT TAP No.0

IN CASE OF PHASE = 0

IN CASE OF PHASE DELAY

IN CASE OF PHASE ADVANCE

| SLOPE | E | PHASE SHIFT DIRECTION |
|---|---|---|
| POSITIVE (0) | 1 | DELAY (1) |
| POSITIVE (0) | 0 | ADVANCE (0) |

| SLOPE | E | PHASE SHIFT DIRECTION |
|---|---|---|
| NEGATIVE (1) | 1 | ADVANCE (0) |
| NEGATIVE (1) | 0 | DELAY (1) |

DEMODULATOR HAVING CROSS POLARIZATION INTERFERENCE CANCELING FUNCTION

BACKGROUND OF THE INVENTION

This invention relates to a demodulator having a cross polarization interference canceling function for canceling the interference between a main polarization and a cross polarization. More particularly, the invention relates to a demodulator capable of canceling cross polarization interference even if there is a phase difference between a demodulated signal on the side of main polarization and a demodulated signal (interference signal) on the side of cross polarization.

A method making joint use of orthogonally polarized waves in which the planes of polarization of two carrier waves having the same frequency are made orthogonal to each other to suppress interference and form two co-channels is advantageous in that radio frequencies can be utilized effectively. Such a method is employed in digital multiplexed wireless apparatus and in other transmission apparatus. A deviation in the planes of polarization occurs in such a transmission apparatus owing to distortion of propagation path caused by falling rain or some other phenomena and it results in that one channel is acted upon by interference from the other channel. Accordingly, the apparatus is provided with a cross polarization interference canceller (XPIC) which suppresses such interference on the receiving end.

FIG. 15 is a diagram illustrating an example of the construction of the receiving section in a transmission apparatus which employs orthogonally polarized waves. As shown in FIG. 15, a receiving antenna 101 is connected to the input of an orthogonal polarizer 102. One output (a V-polarized output) of the polarizer 102 is connected to the input of a QAM demodulating unit 104a via a frequency converter 103a. A first output of the QAM demodulating unit 104a provides a first demodulated signal (Qch, Ich) to a subsequent stage via a cross polarization interference canceller 105a. The other output (an H-polarized output) of the orthogonal polarizer 102 is connected to the input of a QAM demodulating unit 104b via a frequency converter 103b. A first output of the QAM demodulating unit 104b provides a second demodulated signal (Qch, Ich) to a subsequent stage via a cross polarization interference canceller 105b.

A second output of the QAM demodulator 104a enters the cross polarization interference canceller 105b and is used in order to cancel the interference between the cross polarized waves. The second output of the QAM demodulating unit 104b enters the cross polarization interference canceller 105a and is likewise used in order to cancel the interference between the cross polarized waves.

FIG. 16 is a block diagram of a demodulator provided on the side of main polarization and equipped with the cross polarization interference canceling function. Here the V-polarized waves are the main polarized waves and the H-polarized waves represent the cross polarization. The demodulating unit 104a is on the side of the V-polarized waves and so is the cross polarization interference canceller (XPIC) 105a. The construction of the demodulator on the cross polarization output side has a similar construction.

An intermediate-frequency signal resulting from the frequency conversion performed by the frequency converter 103a is applied to one input of each of two mixer circuits 111a, 111b which construct a quadrature demodulator. A local oscillator 112 which oscillates at a carrier frequency fc applies its output to a hybrid device 113. The latter separates this signal into two signals that are 90° out of phase and applies these signals to respective ones of the mixer circuits 111a, 111b at the other input terminals thereof. The output signal of the frequency converter 103a is orthogonally detected by being mixed with the two orthogonal signals in the mixer circuits 111a, 111b and is separated into a baseband in-phase signal and quadrature signal. The baseband in-phase signal (I-channel signal) and quadrature signal (Q-channel signal) have higher harmonics eliminated by low-pass filters 114a, 114b, respectively.

Next, using a sampling clock f output by a voltage-controlled oscillator (VCO) 115 of an internal PLL synchronized to the modulation frequency f of the received signal, A/D converters 116a, 116b convert the in-phase signal and quadrature signal to digital I- and Q-channel signals, respectively, each consisting of, e.g. eight bits. The digital data output by the A/D converters 116a, 116b is such that, in case of 16 QAM, the two higher order bits of eight bits represent digital information allocated to the I- and Q-channel signals. The six lower order bits serve as a signal which represents, in the form of a digital value, error produced by waveform distortion or the like.

The digital I- and Q-channel signals enter a transversal equalizer (TVEQ) 117, which subjects the signals to waveform equalization processing and eliminates transmission path distortion and quadrature distortion. More specifically, the transversal equalizer 117 (1) compensates for transmission path distortion components of the I- and Q-channel signals by digital signal equalization processing, (2) compensates for quadrature components by canceling the Q-channel signal component contained in the I-channel signal and the I-channel signal component contained in the Q-channel signal, and (3) enters the compensated I- and Q-channel signals into subtractors 121a and 121b, respectively, of the cross polarization interference canceller (XPIC) 105a.

FIG. 17 is a diagram showing the construction of a well-known two-dimensional transversal equalizer capable of being used as the transversal equalizer 117. The equalizer includes transversal filters 201a, 202a for eliminating transmission path distortion of the I-channel signal, transversal filters 201b, 202b for eliminating transmission path distortion of the Q-channel signal, and subtractors 203, 204. The subtractor 203 subtracts the Q-channel signal from the I-channel signal to cancel the quadrature component (Q-channel component) contained in the I-channel signal. The subtractor 204 subtracts the I-channel signal from the Q-channel signal to cancel the quadrature component (I-channel component) contained in the Q-channel signal.

Each of the transversal filters 201a~202b is constituted by an N-tap FIR filter (not shown) in which the coefficients can be changed. The filters decide coefficients so as to compensate for transmission path distortion. As mentioned above, when the I- and Q-channel signals are each expressed by eight bits in 16 QAM, the two higher order bits represent data and the six lower order bits represent the error due to waveform distortion, etc. The relationship between identification threshold values of two higher order bits and digital data is illustrated in FIG. 18. (1) When a third bit E is "1", the digital data is greater than an intermediate value (the dashed line) of the identification threshold values. (2) When E is "0", the digital data is less than the intermediate value.

In order to eliminate the effects of transmission path distortion, it will suffice to perform control in such a manner that the value of the six lower order bits become equal to the intermediate value (the ideal value) of the identification threshold values. The transversal filters 201*a*~202*b* eliminate the influence of transmission path distortion by causing the coefficients of the FIR digital filters to converge toward predetermined values in accordance with the above-described logic.

With reference again to FIG. 16, A/D converters 122*a*, 122*b* of the cross polarization interference canceller (XPIC) 105*a* use the sampling clock output by the voltage-controlled oscillator 115 to convert the I- and Q-channel signals that enter from the QAM demodulating unit 104*b* (see FIG. 15) on the side of the H-polarized waves to 8-bit digital signals. The resulting digital I- and Q-channel signals enter a transversal equalizer (TVEQ) 123, which applies waveform equalization processing, removes transmission path distortion and quadrature distortion and applies the resulting I- and Q-channel signals to the subtractors 121*a*, 121*b*, respectively. The subtractor 121*a* subtracts the I-channel signal (interference signal) of cross polarization (H-polarized wave) from the I-channel signal of main polarization (V-polarized wave) and outputs the difference, and the subtractor 121*b* subtracts the Q-channel signal (interference signal) of cross polarization (H-polarized wave) from the Q-channel signal of main polarization (V-polarized wave) and outputs the difference. In other words, even though part of cross polarization acts upon the main polarization as interference, the cross polarization interference canceller (XPIC) 105*a* eliminates the interference component from the main polarization, thereby making it possible to output the correct I- and Q-channel signals of main polarization.

A controller 124 in the XPIC 105*a* has a carrier wave reproducing circuit 124*a* for outputting a carrier-wave frequency control signal from the I-channel signal. A low-pass filter 118 smoothes this control signal and enters the smoothed signal into the local oscillator 112 as a control voltage. The local oscillator 112 controls the local oscillation frequency in accordance with the control voltage. The controller 124 further includes a clock synchronizing circuit 124*b* for outputting a clock-frequency control signal. A low-pass filter 119 smoothes this control signal and enters the smoothed signal into the voltage-controlled oscillator 115 as a control voltage. The voltage-controlled oscillator 115 controls the sampling clock frequency in accordance with the control voltage so as to synchronize the clock to a symbol clock (the clock of the input digital data).

The arrangement of FIG. 16 makes it possible to cancel transmission path distortion, quadrature distortion and interference between channels.

In order to cancel interference between channels correctly, it is desired that the phases of the I- and Q-channel signals of main polarization and the phase of the interference signal coincide. However, the phase of the demodulated signal of main polarization and the phase of the interference signal differ owing to signal delay time and multipath fading of the transmission paths. This disparity in the signal phases diminishes the performance with which the interference between channels is canceled. For this reason, a phase adjuster such as a phase shifter is provided between the voltage-controlled oscillator 115 and the A/D converters 122*a*, 122*b* on the side of the different polarized wave and the phase of the sampling clock output by the voltage-controlled oscillator 115 is adjusted in the phase adjuster by an amount commensurate with the phase difference between the demodulated signal on the side of the main polarized wave and the interference signal. FIG. 19 is a diagram useful in describing the circumstances set forth above. Here MW represents the demodulated signal of main polarization, DW the demodulated signal of cross polarization, which is the interference signal, and IW the interference signal component superposed upon the demodulated signal of main polarization. A delay time td exists between the cross polarization signal DW constituting the interference signal and the interference component IW superposed upon the signal MW of main polarization. Consequently, when the main polarized signal and the cross polarization signal (the interference signal) are A/D-converted using the same sampling clock Cs on the side of main polarization and on the side of cross polarization and the interference signal is subtracted from the main polarized signal, the interference component cannot be canceled correctly. Accordingly, a sampling clock Cs', which is obtained by delaying the phase of the sampling clock Cs by the delay time td is used as the sampling clock on the side of cross polarization.

FIG. 20 is a diagram showing the construction of a demodulator provided on the side of main polarization and equipped with a phase adjuster. Here the demodulator has a digital configuration.

As shown in FIG. 20, the demodulator includes a frequency converter 301 for converting the frequency of the main polarized signal to an intermediate-frequency signal, a local oscillator 302 for outputting a local oscillation frequency signal, an A/D converter 303 for A/D-converting the intermediate-frequency signal in sync with the sampling clock Cs, an A/D converter 304 for A/D-converting the intermediate-frequency signal of the cross polarization, which enters from the side of the cross polarization waves, in sync with the sampling clock Cs', a voltage-controlled oscillator (VCO) 305 for generating the sampling clock Cs, a phase adjuster 306 for shifting the phase of the sampling clock Cs, a digital quadrature demodulator 307 for multiplying the output of the A/D converter 303 by digital $\cos\omega t$, $-\sin\omega t$ signals to thereby generate baseband I- and Q-channel signals on the side of main polarization, and a digital quadrature demodulator 308 for multiplying the output of the A/D converter 304 by digital $\cos\omega t$, $-\sin\omega t$ signals to thereby generate baseband I- and Q-channel signals on the side of cross polarization. The digital $\cos\omega t$, $-\sin\omega t$ signals can be generated by discretely storing values of $\cos\omega t$, $-\sin\omega t$ in a ROM in advance and then successively reading the values of $\cos\omega t$, $-\sin\omega t$ conforming to each moment of time out of the ROM.

The demodulator further includes roll-off filters 309, 310 constituted by FIR filters for imparting a roll-off characteristic to the main polarization I- and Q-channel signals output by the quadrature demodulator 307, roll-off filters 311, 312 constituted by FIR filters for imparting a roll-off characteristic to the cross polarization I- and Q-channel signals output by the quadrature demodulator 308, and transversal equalizers (TVEQ) 313, 314. The transversal equalizer 313 corrects transmission path distortion and quadrature error contained in the I- and Q-channel signals on the side of the main polarized waves, and the transversal equalizer 314 corrects transmission path distortion and quadrature error contained in the I- and Q-channel signals on the side of cross polarization. Further, a subtractor 315 subtracts the cross polarization I-channel signal component from the main polarization I-channel signal, and a subtractor 316 subtracts the cross polarization Q-channel signal component from the main polarization Q-channel signal. A controller 317 outputs a signal CRF for controlling carrier wave frequency and a signal CLF for controlling sampling clock frequency. A low-pass filter 318 smoothes the signal CRF and enters the smoothed signal into the local oscillator 302 as a control voltage to control the oscillation frequency of the local oscillator. A low-pass filter 319 smoothes the signal CLF and enters the smoothed signal into the voltage-controlled oscillator 305 as a control voltage to control the sampling clock frequency of the voltage-controlled oscillator.

The phase adjuster 306 performs an adjustment to optimize the phase of the interference signal. Though the phase difference between the demodulated signal on the side of the main polarized waves and the interference signal differs depending upon the signal delay time and the multipath fading of the transmission paths, the adjusted phase generally is fixed.

In recent years, however, a demodulator equipped with a cross polarization interference canceling function for automatically regulating the amount of adjusted phase has been investigated and proposed for the purpose of eliminating the need for cable adjustment at the time of equipment installation and for improving upon the amount of XPIC compensation at the time of fading.

FIG. 21 is a diagram showing the construction of a demodulator provided on the side of main polarization and equipped with a function for adjusting phase automatically. Elements identical with those shown in FIG. 20 are designated by like reference characters. The arrangement of FIG. 21 differs from that of FIG. 20 in that (1) the controller 317 is provided with a function which decides the phase of the sampling clock (2) the phase control signal PSC enters the phase adjuster 306 from the controller 317, and (3) the phase adjuster 306 controls the phase of the sampling clock Cs' of A/D converter 304 based upon the phase control signal PSC.

The arrangement of FIG. 21 makes it possible to adjust the phase of the sampling clock automatically. As a result, the phase of the interference waves (cross polarization) is adjusted automatically so as to be the same as the phase of the demodulated signal of main polarization and the interference component can be removed from the demodulated signal of main polarization.

With the conventional method of controlling the phase of the sampling clock described above, a new problem arises when the phase difference becomes large in size and clock phase is controlled over a wide range.

When the clock phase is controlled by the phase adjuster 306, the phase of the digital output signal from the A/D converter 304 naturally varies by following up such control, and the phases of all subsequent digital signals also change by following up the variation. However, the compensated outputs of the transversal equalizer 313 on the side of cross polarization are subtracted from the output signals of the transversal equalizer 313 on the side of main polarization in the subtractors 315 and 316. As a consequence, it is necessary to change over to the clock phase on the side of main polarization by the time the subtractors 315, 316 are reached. Changing over the clock is achieved by storing the data on the side of cross polarization in memory temporarily by the clock Cs' and reading the data out of the memory immediately thereafter by the clock Cs on the side of main polarization, followed by processing the data. If the phase difference is large, however, clock changeover becomes impossible. The result is a narrowing of the range of clock phase adjustment in the A/D converter on the interference side (the side cross polarization). This means that phase cannot be adjusted if the phase difference is too large.

SUMMARY OF THE INVENTION

Accordingly, an object of the present invention is to perform phase adjustment and increase cross polarization interference canceling performance even in a case where the phase difference between a demodulated signal of main polarization and an interference signal is large.

Another object of the present invention is to adopt a digital configuration for such a demodulator and enable an increase in amount of hardware to be suppressed.

According to the present invention, the foregoing objects are attained by providing a demodulator having a cross polarization interference canceling function for canceling interference of cross polarization in main polarization, comprising a demodulating unit for demodulating a baseband signal of main polarization, an interference cancellation unit for canceling an interference signal component from a demodulated signal of main polarization, and phase control means for controlling phase of an interference signal, which is a baseband signal of cross polarization.

Further, according to the present invention, the foregoing objects are attained by providing a demodulator having a cross polarization interference canceling function for canceling interference of cross polarization in main polarization, comprising a demodulating unit for demodulating a baseband signal of main polarization, an interference cancellation unit for canceling an interference signal component from a demodulated signal of main polarization, digital roll-off filters for imparting the demodulated signal of main polarization and an interference signal with roll-off characteristics, and phase control means for controlling coefficients of the roll-off filter for the interference signal in dependence upon phase imparted to the interference signal.

Other features and advantages of the present invention will be apparent from the following description taken in conjunction with the accompanying drawings.

BRIEF DESCRIPTION OF THE DRAWINGS

DESCRIPTION OF THE PREFERRED EMBODIMENTS (A) Overview of the Invention (a) First Aspect of the Invention FIG. 1 is a block diagram useful in describing an overview of a first aspect of the present invention. The arrangement of FIG. 1 includes a demodulating unit 1 on the side of main polarization. Main polarized waves signal MW enters the demodulating unit 1, which demodulates the baseband signal. An interference cancellation unit 2 cancels the interference component from the baseband demodulated signal, and phase control means 3 controls the phase of an interference signal. The phase control means 3 includes a FIR-type phase shifter 4 for changing the phase of the interference signal, a controller 5 for deciding the phase of the interference signal and setting a coefficient conforming to this phase in the phase shifter 4, and a memory 6 for storing the correspondence between phase and the coefficient set in the phase shifter 4.

Figure 1:
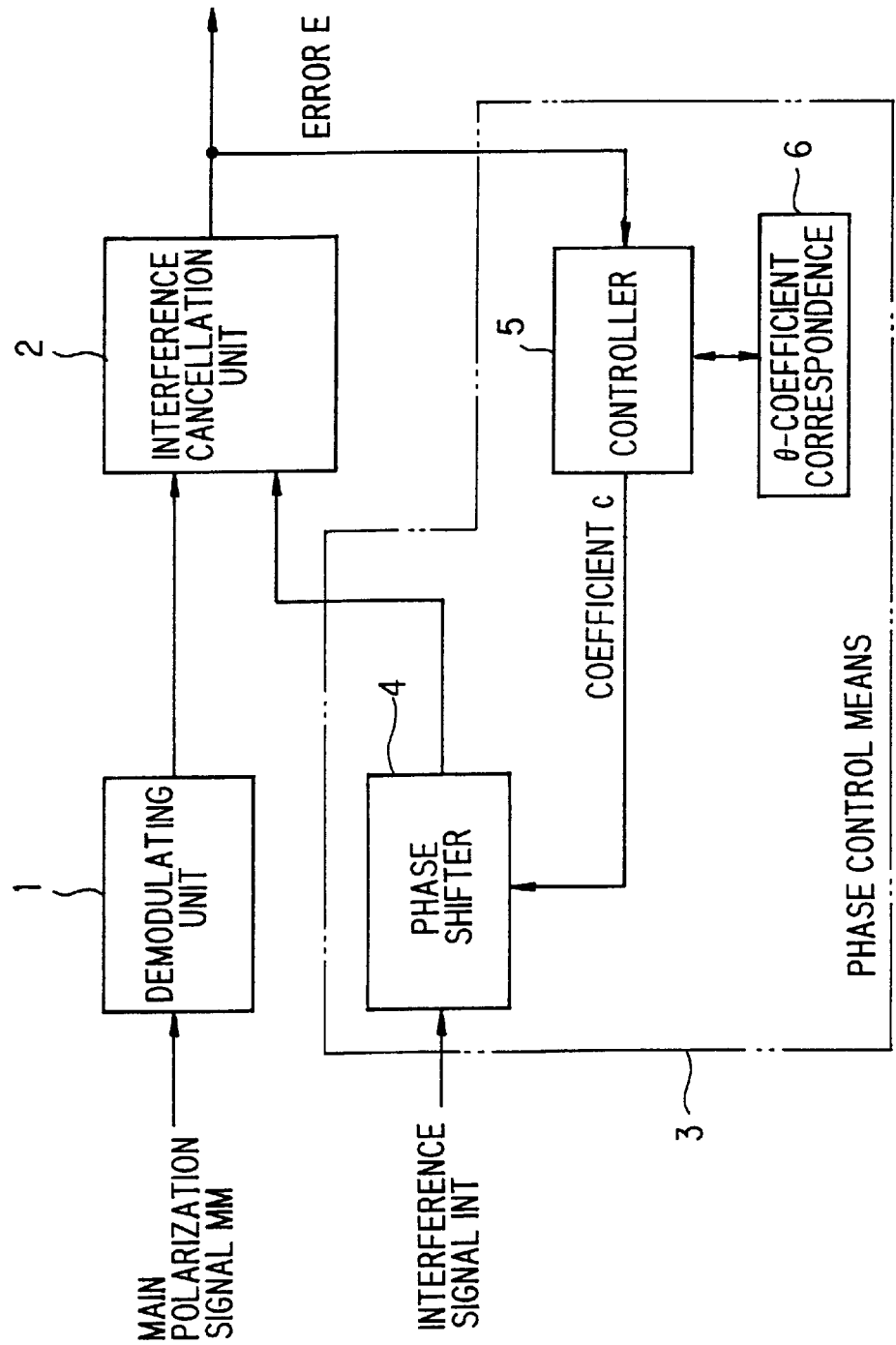
FIG. 1 is a block diagram useful in describing an overview of a first aspect of the present invention.

The demodulator 1 on the side of main polarization receives the main polarized wave signal MW applied thereto and demodulates the baseband signal. The controller 5 of the phase control means 3 decides the phase $\theta$ of an interference signal INT based upon an error E in the demodulated signal and sets a coefficient c conforming to the phase $\theta$ in the phase shifter 4, which is constituted by a FIR filter. The phase shifter 4 controls the phase of the interference signal and enters the controlled phase into the interference cancellation unit 2. The latter cancels the phase-controlled interference signal from the demodulated signal of the baseband, thereby canceling the interference component. In this case the correspondence between the phase $\theta$ and the coefficient c set in the phase shifter is stored in the memory 6 beforehand. The controller 5 obtains the coefficient c corresponding to the calculated phase $\theta$ from the memory and enters the coefficient into the phase shifter 4.

If this arrangement is adopted, the phase of the sampling clock is not changed; rather, the phase of the interference signal per se is controlled. Changing over the clock is unnecessary. Even if the phase difference between the main polarized wave signal and the interference signal is large, phase is adjusted reliably to increase cross polarization interference canceling performance. In addition, the phase shifter is constituted by a FIR-type digital filter the coefficients of which can be changed. If the phase of the interference signal is adjusted by controlling the coefficient value of each tap in dependence upon the amount of phase adjustment, the invention can be applied to a digital demodulator. Phase adjustment can be carried out with ease by storing the correspondence between the amount of phase adjustment and the coefficient value of each tap in memory beforehand.

(b) Second Aspect of the Invention

Figure 2:
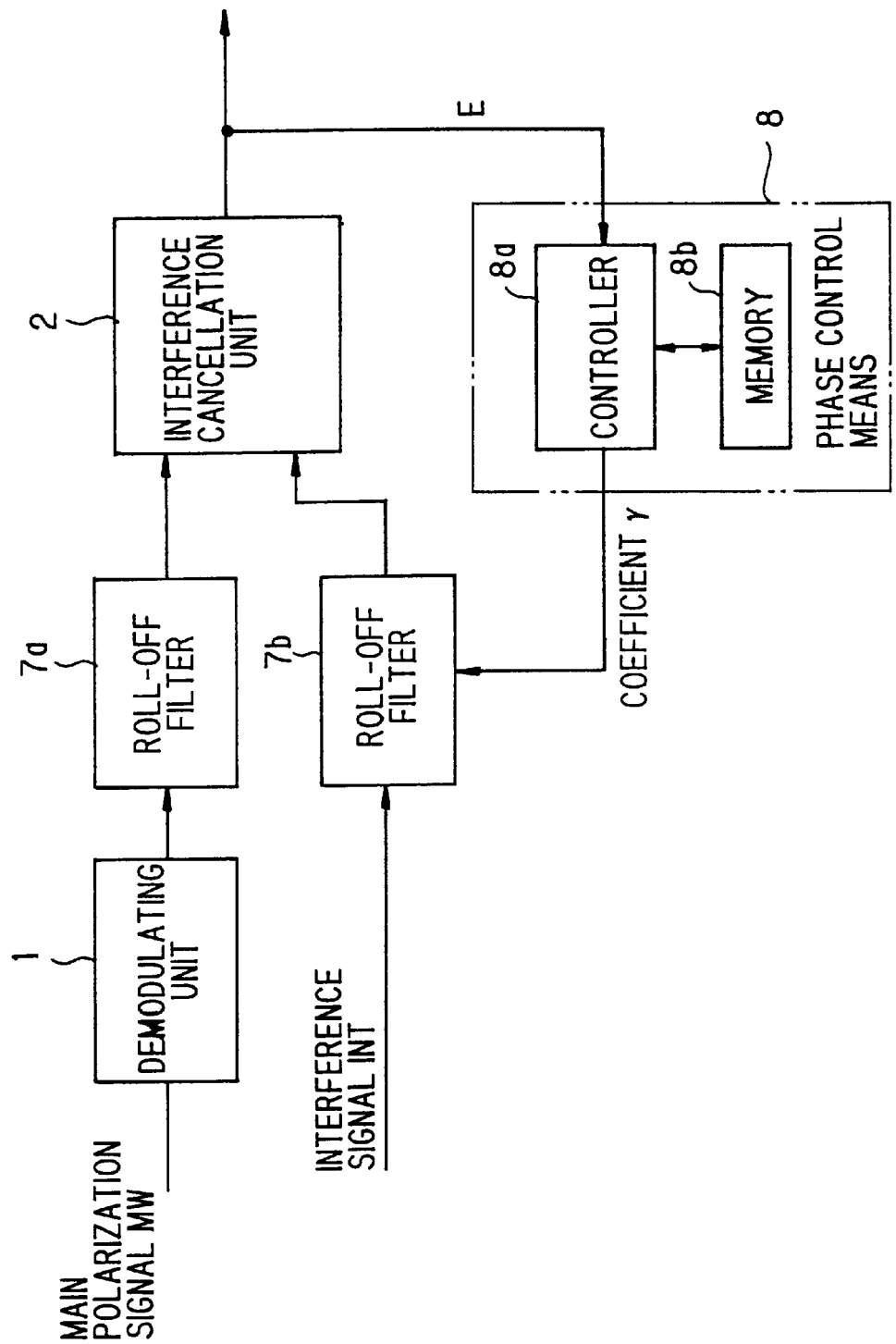
FIG. 2 is a block diagram useful in describing an overview of a first aspect of the present invention.

FIG. 2 is a block diagram useful in describing an overview of a second aspect of the present invention. The arrangement of FIG. 1 includes the demodulating unit 1 on the side of the main polarized waves. The main polarized wave signal MW enters the demodulating unit 1, which demodulates the baseband signal. The interference cancellation unit 2 cancels the interference component from the baseband demodulated signal. Roll-off filters 7a, 7b constituted by FIR filters impart roll-off characteristics to the demodulated signal and interference signal, respectively. Phase control means 8 controls the coefficient of the roll-over filter 7b for the interference signal in dependence upon the phase of the interference signal. The phase control means 8 includes a controller 8a and a memory 8b. The controller 8a decides the phase $\theta$ of the interference signal, sets a coefficient conforming to the phase $\theta$ and roll-off characteristic in the roll-off filter 7b and controls the phase of the interference signal. The memory 8b stores the correspondence between the phase $\theta$ and the coefficient set in the roll-off filter.

The demodulator 1 receives the main polarized wave signal MW applied thereto and demodulates the baseband signal. The controller 8a of the phase control means 8 decides the phase $\theta$ of an interference signal INT based upon the error E in the demodulated signal and sets a coefficient $\gamma$ conforming to the phase $\theta$ and the roll-off characteristic in the roll-off filter 7b. The roll-off filter 7b imparts a roll-off characteristic upon the interference signal, controls the phase of the interference signal and enters the controlled phase into the interference signal cancellation unit 2. The latter subtracts the interference signal whose phase has been controlled by the roll-off filter 7b from the demodulated signal on the side of main polarization to thereby cancel the interference component. In this case the correspondence between the phase $\theta$ and the coefficient set in the roll-off filter is stored in the memory 8b beforehand. The controller 8a obtains the coefficient corresponding to the calculated phase $\theta$ from the memory and enters the coefficient into the roll-off filter 7b.

Further, the phase control means 8 is capable of deciding a coefficient value without storing the correspondence between phases and coefficients in memory. Specifically, the phase control means 8 either delays or advances the phase of the interference signal. Consider two taps, one on either side of the center tap of the roll-off filter 7b. (1) If the phase of the interference signal is to be delayed, the phase control means 8 increases the value of the coefficient $C_1$ of the tap on the output side of the center tap and decreases the value of the coefficient $C_{-1}$ of the tap on the input side of the center tap. (2) If the phase of the interference signal is to be advanced, the phase control means 8 decreases the value of the coefficient $C_1$ of the tap on the output side and increases the value of the coefficient $C_{-1}$ of the tap on the input side.

Alternatively, consider m-number (where m is an integer equal to or greater than 2) of taps on either side of the center tap (for a total of 2m-number of taps). The phase control means 8 either delays or advances the phase of the interference signal. (1) If the phase of the interference signal is to be delayed, the phase control means 8 increases the values of a first group of coefficients $C_1$, $C_3$, . . . of alternate taps on the output side of the center tap of the roll-off filter 7b, decreases the values of a second group of coefficients $C_2$, $C_4$, ... of alternate taps on the output side of the center tap, decreases the values of a first group of coefficients $C_{-1}, C_{-3}, \ldots$ of alternate taps on the input side of the center tap and increases the values of a second group of coefficients $C_{-2}, C_{-4}, \ldots$ of alternate taps on the input side of the center tap.
(2) If the phase of the interference signal is to be advanced, the phase control means 8 decreases the values of the first group of coefficients $C_1, C_3, \ldots$ of alternate taps on the output side of the center tap of the roll-off filter 7b, increases the values of the second group of coefficients $C_2, C_4, \ldots$ of alternate taps on the output side of the center tap, increases the values of the first group of coefficients $C_{-1}, C_{-3}, \ldots$ of alternate taps on the input side of the center tap and decreases the values of the second group of coefficients $C_{-2}, C_{-4}, \ldots$ of alternate taps on the input side of the center tap. The farther a tap is from the center tap, the smaller the percentage of increase or decrease in the coefficient value is made.

If this arrangement is adopted, effects the same as those described in conjunction with FIG. 1 are obtained.

Further, it is so arranged that the phase of the interference signal is controlled by changing each tap coefficient value of the roll-off filter. As a result, it is unnecessary to provide a separate phase shifter, thus making it possible to suppress an increase in hardware.

Further, a total of 2m (m≧1) tap coefficients of taps on both sides of the center tap need only be controlled. Moreover, the phase of the interference waves can finally be adjusted merely be increasing or decreasing each of the tap coefficients depending upon whether phase is delayed or advanced. Accordingly, when phase is adjusted, it is unnecessary to store the correspondence between amount of phase adjustment and the coefficient value of each tap in memory, thus making it possible to suppress an increase in amount of hardware. In particular, the increase in amount of hardware when m=1 holds can be kept very small.

Embodiments of the Invention (B) First Embodiment (a) Overall Configuration

Figure 3:
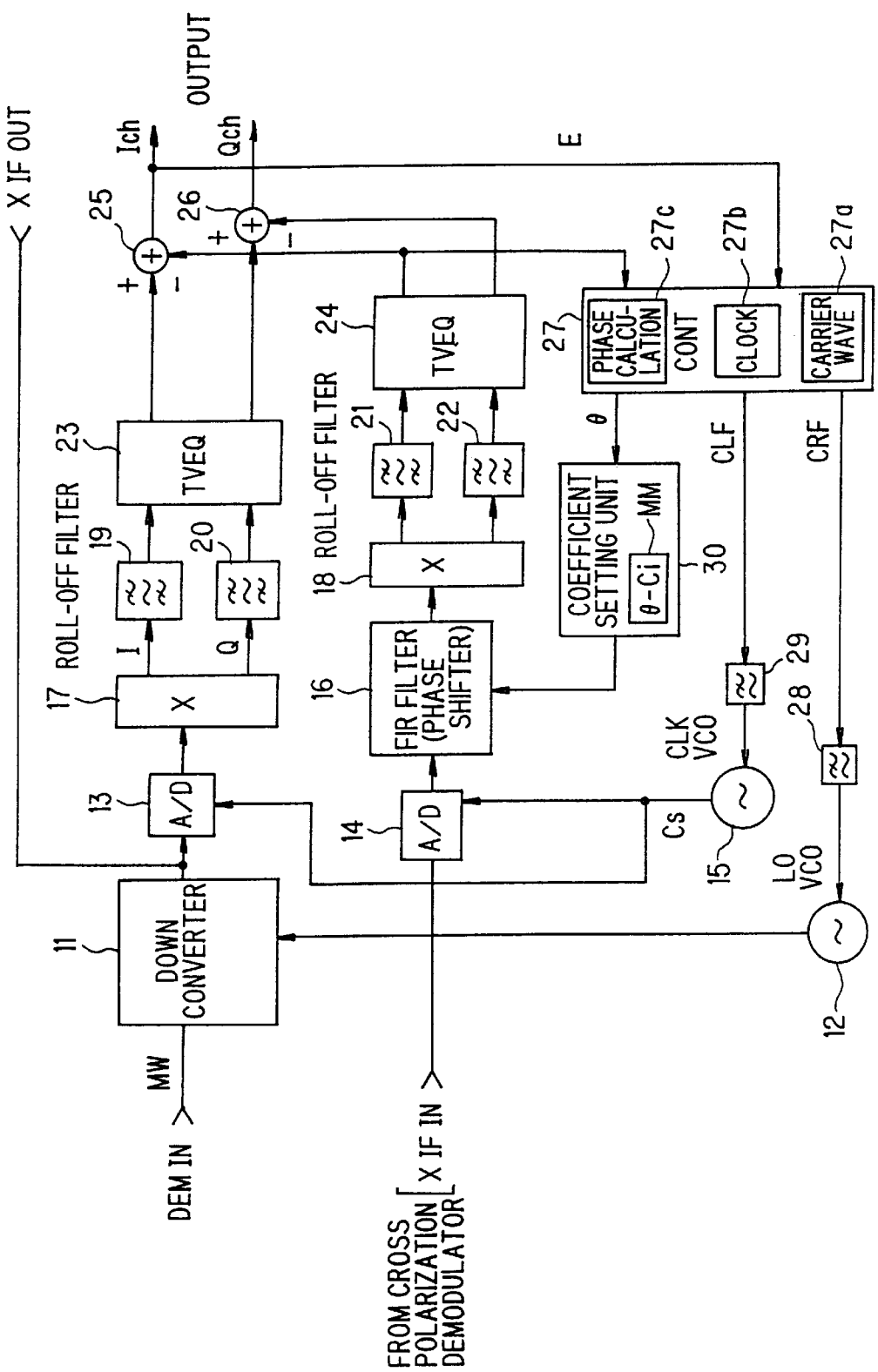
FIG. 3 is a diagram showing the construction of a demodulator according to a first embodiment of the present invention.

FIG. 3 is a diagram showing the construction of a demodulator equipped with a cross polarization interference cancellation function according to a first embodiment of the present invention. As shown in FIG. 3, the demodulator includes a frequency converter 11 for converting the frequency of the main polarized wave signal MW to an intermediate-frequency signal, a local oscillator (LO VCO) 12 for outputting a local oscillation frequency signal, an A/D converter 13 for A/D-converting the intermediate-frequency signal in sync with the sampling clock Cs, an A/D converter 14 for A/D-converting the intermediate-frequency signal of the cross polarization, which enters from the side of the cross polarization waves, in sync with the sampling clock Cs, a voltage-controlled oscillator (CLK VCO) 15 for generating the sampling clock Cs, and a phase shifter 16 for controlling the phase of the digital data output by the A/D converter 14. The phase shifter 16 is constituted by an FIR filter having (2n+1) taps whose coefficients can be changed.

The demodulator further includes a digital quadrature demodulator 17 for multiplying the output of the A/D converter 13 by digital $\cos\omega t$, $-\sin\omega t$ signals to thereby generate baseband I- and Q-channel signals on the side of main polarization, and a digital quadrature demodulator 18 for multiplying the output of phase shifter 16 by digital $\cos\omega t$, $-\sin\omega t$ signals to thereby generate baseband I- and Q-channel signals on the side of cross polarization. The digital data output by the quadrature demodulators 17, 18 is 8-bit digital data, by way of example. In case of 16 QAM, the two higher order bits are allocated to the I- and Q-channel signals. The six lower order bits represent the error. The I- and Q-channel signals output by the quadrature demodulator 18 constitute the interference wave signals of the I- and Q-channel signals output by the quadrature demodulator 17.

The demodulator further includes roll-off filters 19, 20 constituted by FIR filters for imparting a roll-off characteristic to the main polarization demodulated signals (I- and Q-channel signals) output by the quadrature demodulator 17, roll-off filters 21, 22 constituted by FIR filters for imparting a roll-off characteristic to the cross polarization I- and Q-channel signals output by the quadrature demodulator 18, and transversal equalizers (TVEQ) 23, 24. The transversal equalizer 23 corrects transmission path distortion and quadrature error contained in the I- and Q-channel signals on the main polarization side, and the transversal equalizer 24 corrects transmission path distortion and quadrature error contained in the I- and Q-channel signals on the cross polarization side.

A subtractor 25 subtracts the cross polarization I-channel signal component from the main polarization I-channel signal, and a subtractor 26 subtracts the cross polarization Q-channel signal component from the main polarization Q-channel signal. As a result, the cross polarization interference wave component with respect to the main polarized waves is eliminated so that correct main polarization I- and Q-channel signals can be output.

A controller 27 has a carrier wave reproducing circuit 27a, a clock synchronizing circuit 27b and a phase calculating circuit 27c. Numerals 28, 29 denote low-pass filters. The carrier wave reproducing circuit 27a of the controller 27 outputs a carrier wave frequency control signal CRF from the I-channel signal. The low-pass filter 28 smoothes the signal CRF and enters the smoothed signal into the local oscillator 12 as a control voltage, and the local oscillator 12 controls the location oscillation frequency in accordance with the control voltage. The clock synchronizing circuit 27b of the controller 27 outputs a clock frequency control signal CLF. The low-pass filter 29 smoothes the signal CLF and enters the smoothed signal into the voltage-controlled oscillator 15 as a control voltage. The voltage-controlled oscillator 15 controls the frequency of the sampling clock Cs in accordance with the control voltage so as to achieve synchronization with the symbol clock. The phase calculating circuit 27c of the controller 27 uses the main polarization and cross polarization I-channel signals to calculate the phase θ and then outputs the same.

A coefficient setting unit 30 stores the correspondence between the phase θ and the coefficient Ci set in the phase shifter 16 in a memory MM, reads the coefficient Ci conforming to the entered phase θ out of the memory and applies the coefficient to the phase shifter 16.

(b) Shifter

Figure 4:
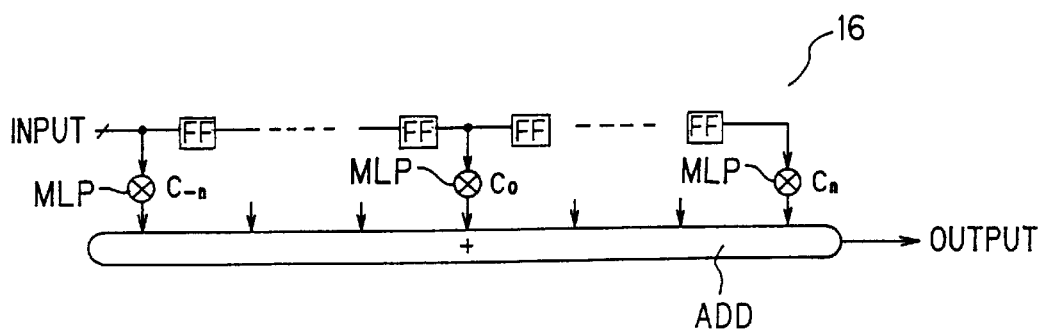
FIG. 4 is a diagram showing an example of the construction of a phase shifter (FIR filter)

FIG. 4 is a diagram showing the construction of the phase shifter 16. The phase shifter 16 is constituted by a digital variable-coefficient FIR filter having (2n+1) taps. The phase shifter 16 includes delay circuits FF each for delaying input data by one sampling time, multipliers MLP for multiplying the data output from the delay circuits by coefficients $C_{-n} \sim C_n$, and an adder ADD for adding the results of multiplication from the multipliers and outputting the sum.

Figure 5A:
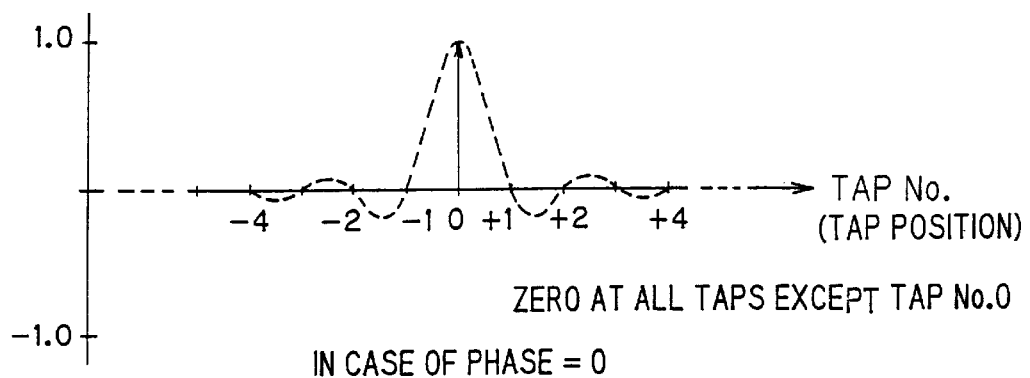
FIGS. 5A through 5C are diagrams useful in describing impulse response and tap coefficient calculation.
Figure 5B:
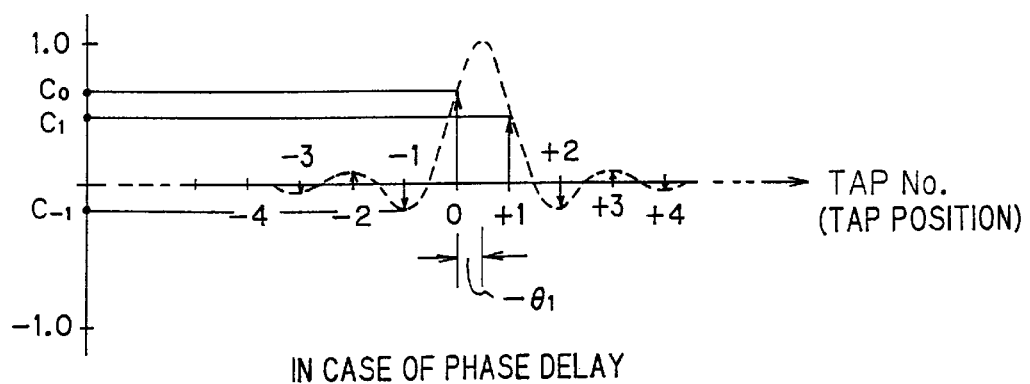
Figure 5C:
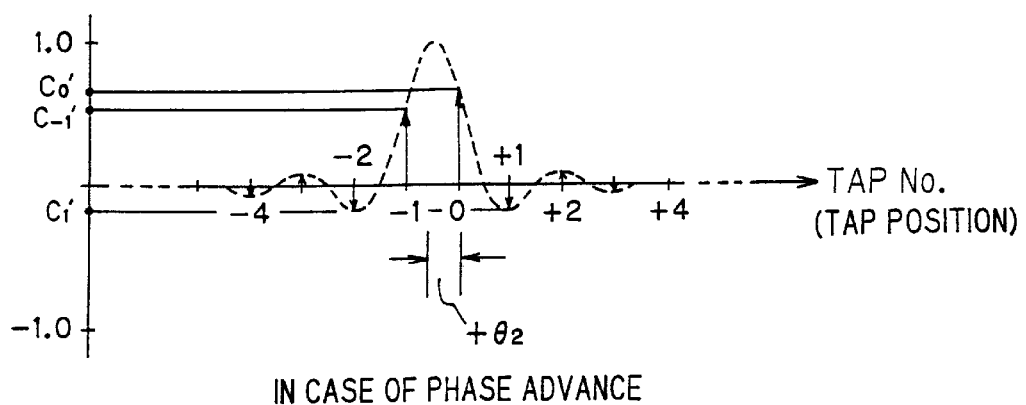

FIG. 5A illustrates impulse response when the coefficient $C_0$ of the center tap of this FIR filter is made 1 and the coefficients of all of the other taps are made 0. It should be noted that the impulse response is zero at all tap positions other than the center tap position. FIG. 5B shows the result when a phase delay of $\theta_1$ is applied to the impulse response of FIG. 5A, and FIG. 5C shows the result when a phase delay of $\theta_2$ is applied to the impulse response of FIG. 5A.

Accordingly, in order to delay the input signal by the phase $\theta_1$, the impulse response values $C_0, C_1, C_{-1} \ldots$ at the tap positions of FIG. 5B should be set as the coefficient values of the corresponding taps. Further, in order to delay the input signal by the phase $\theta_2$, the impulse response values $C_0', C_1', C_{-1}' \ldots$ at the tap positions of FIG. 5C should be set as the coefficient values of the corresponding taps.

Thus, if the correspondence between the phase $\theta$ and the $(2n+1)$ $(n \geq 1)$ tap coefficient values in phase shifter 16 is stored in the memory MM in advance, a tap coefficient value conforming to any phase $\theta$ can be obtained immediately and set in the phase shifter 16, whereby phase control can be carried out.

(c) Phase Calculation Processing

Figure 6A:
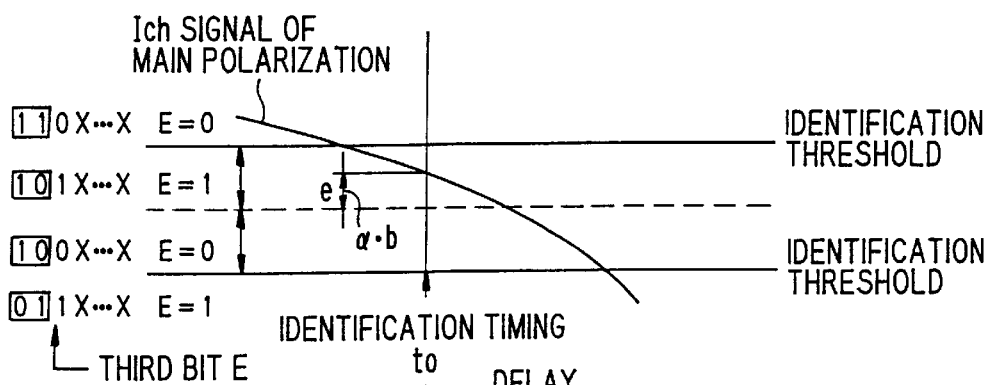
FIGS. 6A through 6C are diagrams useful in describing phase calculation processing.
Figure 6B:
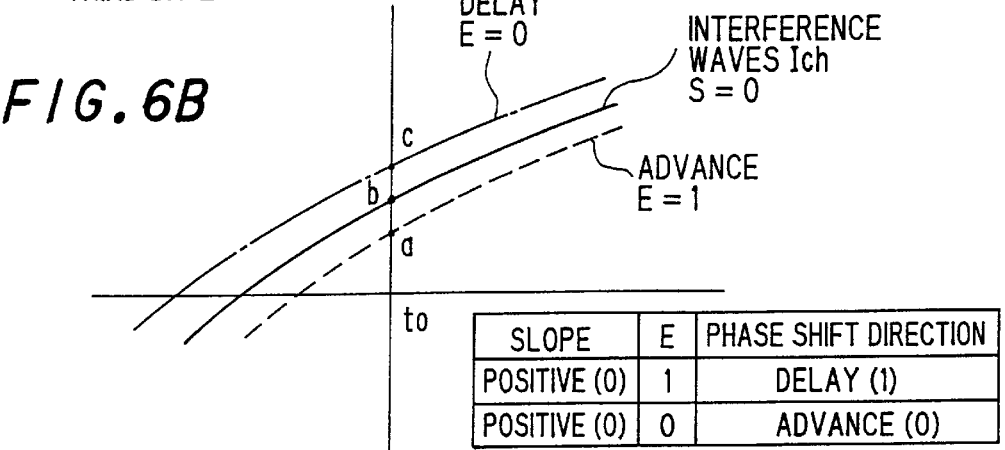
Figure 6C:
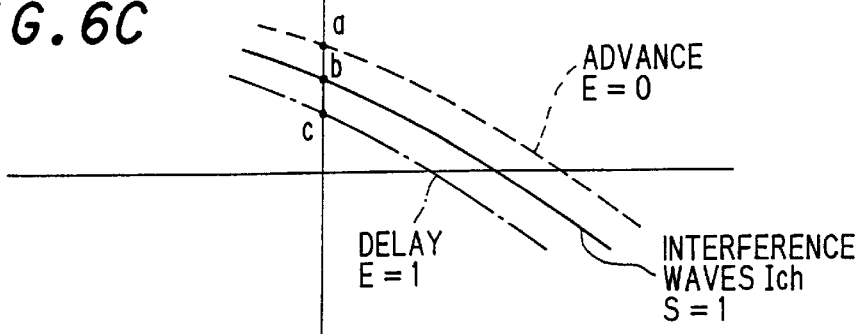

FIGS. 6A through 6C are diagrams useful in describing phase calculation processing performed by the phase calculating circuit 27c of the controller 27.

If each of the I- and Q-channel signals is represented by eight bits in 16 QAM, the two higher order bits represent data and the six lower order bits represent error due to waveform distortion or the like. The relationship between identification thresholds of the two higher order bits and the digital data is as shown in FIG. 6A. When a third bit E of the digital data is "1", the I-channel signal is greater than an intermediate value (ideal value) of the identification threshold values. If E is "0", then the I-channel signal is less than the intermediate value.

Error or deviation e from the intermediate value arises owing to interference from cross polarization.

Accordingly, when there is no phase difference between the main polarization I-channel signal and the cross polarization I-channel signal (interference wave signal), the relation e=0 is substantially obtained if a predetermined percentage of the interference wave signal is subtracted from the main polarization I-channel signal. For example, when the phase difference is equal to zero, the interference wave signal is as indicated by the solid line in FIG. 6B (the value of the interference wave signal at the identification timing is b). If the above-mentioned percentage is $\alpha$, then $\alpha \cdot b$ is subtracted from the main polarization I-channel signal, whereby the relation e=0 can be obtained.

However, the phase difference is not zero; phase leads as indicated by the dashed line in FIG. 6B or lags as indicated by the dot-and-dash line. When the phase of the interference waves leads, the value of the interference wave signal at the identification timing to becomes a, which is less than b. Consequently, even if $\alpha \cdot a$ is subtracted from the main polarization I-channel signal, the result is not e=0 but e>0. In other words, the third bit (error bit) E of the digital data becomes "1". This means that the phase of the interference waves is leading in a case where the slope of the interference waves is positive and the error bit E is "1". Hence it is required that control be performed to delay the phase of the interference waves. [A]

When the phase of the interference waves lags, on the other hand, the value of the interference wave signal at the identification timing to becomes c, which is greater than b. Consequently, when $\alpha \cdot c$ is subtracted from the main polarization I-channel signal, the result is e<0. In other words, the third bit (error bit) E of the digital data becomes "0". This means that the phase of the interference waves is lagging in a case where the slope of the interference waves is positive and the error bit E is "0". Hence it is required that control be performed to advance the phase of the interference waves. [B]

Combining [A] and [B] set forth above results in the table of FIG. 6B. The foregoing is for a case where the slope of the interference waves is positive. The table shown in FIG. 6C is obtained in a case where the slope is negative.

Thus, let positive slope be represented by "0" and negative slope by "1", and let an advance phase shift be "0" and a delay phase shift be "1". If the exclusive-OR of the slope S and error bit E is taken and the result is "0", then control is performed so as to advance the phase. If the result of the exclusive-OR operation is "1", then control is performed so as to delay the phase.

(d) Phase Calculating Circuit

Figure 7:
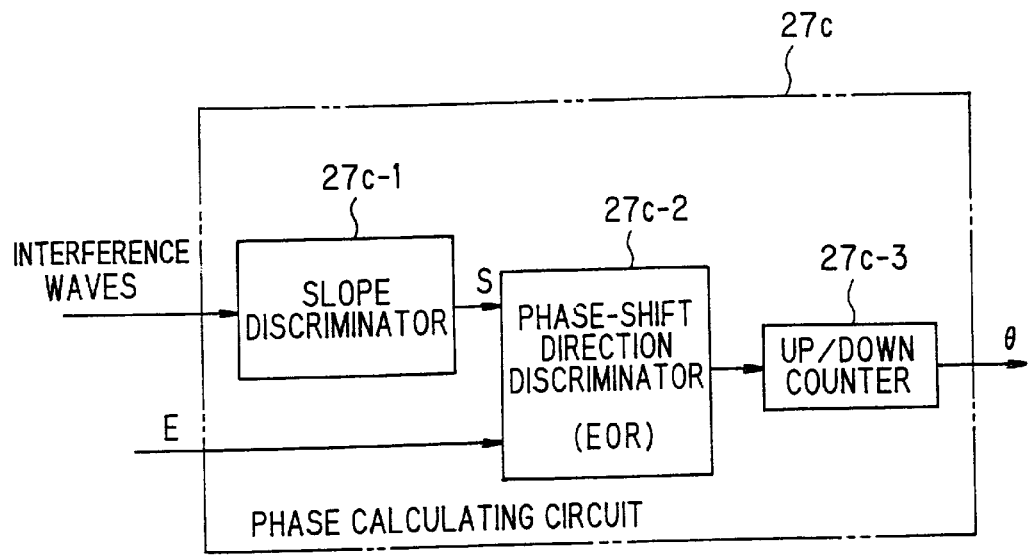
FIG. 7 is a diagram showing the construction of a phase calculation unit.

FIG. 7 is a block diagram showing the construction of the phase calculating circuit 27c. The circuit includes a slope discriminator 27c-1 for discriminating the slope S of the interference wave signal, and a phase-shift direction discriminator 27c-2 for taking the exclusive-OR between the third bit (error bit) E of the I-channel signal of the main polarization and the slope S and outputting the result. A "1" output means that the phase of the interference waves is delayed and a "0" output means that the phase of the interference waves is advanced. The phase calculating circuit 27c further includes an up/down counter 27c-3 counted up when the output signal of the phase-shift direction discriminator 27c-2 is "0" (advance direction) and counted down when the output signal of the phase-shift direction discriminator 27c-2 is "1" (delay direction). The counter 27c-3 outputs the count as the phase $\theta$ of the interference waves.

(e) Overall Operation

The error bit E of the main polarization demodulated signal (the I-channel signal) and the interference wave signal enter the phase calculating circuit 27c of the control circuit 27 from the subtractor 25 and transversal equalizer 24, respectively. The phase calculating circuit 27c discriminates the phase shift direction based upon the error bit E and slope S of the interference waves and increases or decreases ($\pm 1$) the phase $\theta$ depending upon the shift direction and then outputs the phase. The coefficient setting unit 30 reads the tap coefficient values $C_{-n} \sim C_n$ conforming to the phase $\theta$ out of the memory MM and sets the coefficients at the taps of the phase shifter 16 constituted by the FIR filter. The phase shifter 16 performs control in such a manner that the phase of the output data of the A/D converter 14 becomes $\theta$ and enters the phase into the quadrature demodulating unit 18. The result is a decrease in the phase difference between the interference waves and the demodulated signal of the main polarized waves output by the transversal equalizers 23 and 24, respectively.

The foregoing operation is repeated so that the count recorded by the up/down counter 27c-3 (FIG. 7) will converge to predetermined value. At convergence, the phase difference between the interference waves and the demodulated signal of main polarization becomes substantially zero and the interference component contained in the demodulated signal of main polarization is canceled correctly.

(C) Second Embodiment

The FIR-type phase shifter 16 is separately provided in the first embodiment. However, FIR filters are already present in the form the roll-off filters 19~22. Accordingly, in the second embodiment, the phase shifter is dispensed with by controlling the coefficient values of the cross polarization roll-off filters 21, 22 based upon the phase $\theta$ of the interference waves.

Figure 8:
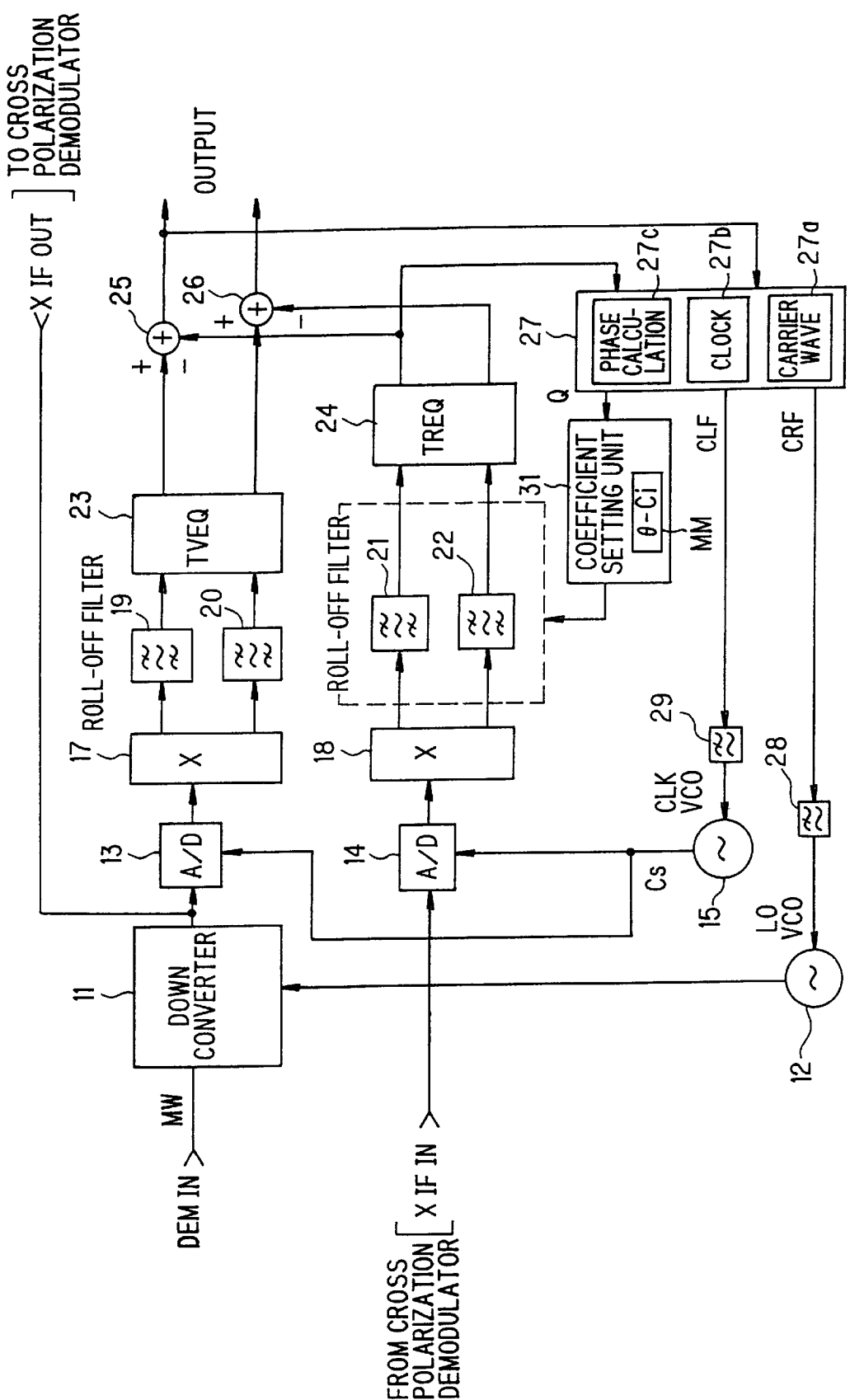
FIG. 8 is a diagram showing the construction of a demodulator according to a second embodiment of the present invention.

FIG. 8 is a diagram showing the construction of a demodulator equipped with a cross polarization interference cancellation function according to a second embodiment of the present invention. Elements identical with those of the first embodiment in FIG. 3 are designated by like reference characters. The second embodiment differs from the first embodiment is that:

(1) the phase shifter is eliminated;

(2) the coefficient values of the roll-off filters 21, 22 to which the I- and Q-channel signals output by the quadrature demodulating unit 18 on the cross polarization size are varied in dependence upon the phase θ of the interference signal;

(3) the phase of the interference waves is made θ and the coefficient values which impart the predetermined roll-off characteristic are stored in the memory MM in correspondence with θ; and (4) coefficient values conforming to the phase θ calculated are obtained from the memory MM and set in the roll-off filters 21, 22.

Figure 9:
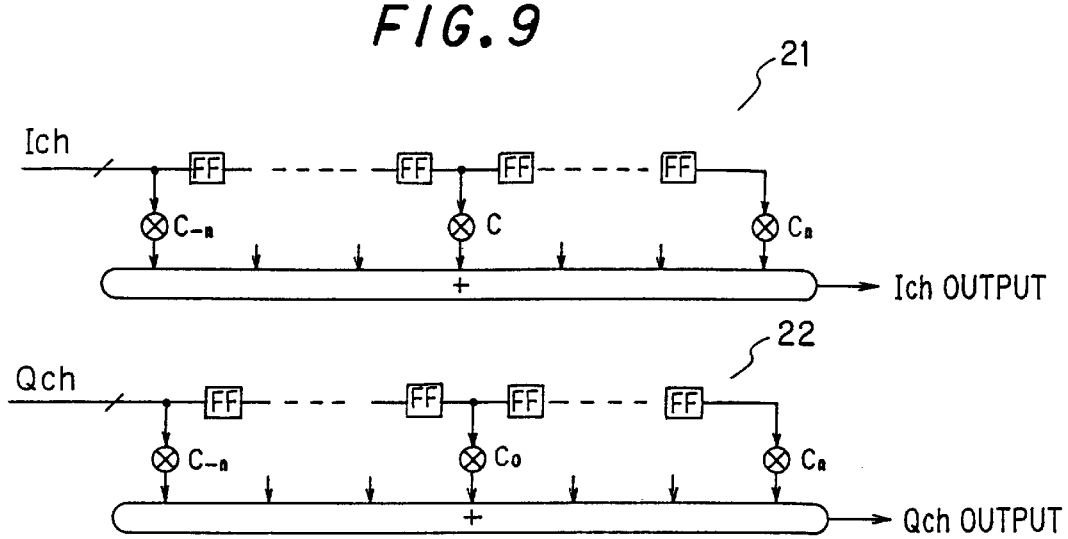
FIG. 9 is a diagram showing an example of a roll-off filter.

FIG. 9 is a diagram showing the construction of the roll-off filters 21, 22, each of which is constituted by a FIR filter having (2n+1) taps. It should be noted that it is unnecessary to control all of the tap coefficients of the roll-off filters 21, 22 by the phase θ; it will suffice to control at least a total of three tap coefficients, namely the coefficients of the center tap and of one tap on either side of the center tap.

The error bit E of the main polarization demodulated signal (the I-channel signal) and the interference wave signal enter the phase calculating circuit 27c of the control circuit 27 from the subtractor and transversal equalizer 24, respectively. The phase calculating circuit 27c discriminates the phase shift direction based upon the error bit E and slope S of the interference waves and increases or decreases (±1) the phase θ depending upon the shift direction and then outputs the phase. A coefficient setting unit 31 obtains coefficient values conforming to the phase θ from the memory MM and sets the coefficients in the roll-off filters 21, 22. The roll-off filters 21, 22 impart the I- and Q-channel signals output by the quadrature demodulating unit 18 with a roll-off characteristic and perform control in such a manner that the phase becomes θ. The result is a decrease in the phase difference between the interference waves and the demodulated signal of the main polarized waves.

The foregoing operation is repeated so that the phase θ converges to predetermined value. At convergence, the phase difference between the interference waves and the demodulated signal of main polarization becomes substantially zero and the interference component contained in the demodulated signal of main polarization is canceled correctly.

(D) Third Embodiment

In the second embodiment, the correspondence between the phase θ and coefficient values is stored in the memory MM in advance and the coefficient setting unit 31 reads the coefficient values conforming to the phase θ entered from the phase calculating unit 27a out of the memory and sets the coefficient values in the roll-off filters 21, 22. However, the memory for storing the coefficient values conforming to the phase θ is required. In the third embodiment, the coefficient values are calculated, without using a memory which stores correspondence between the phase θ and coefficient values, and the calculated values are set in the roll-off filters.

(a) Construction

Figure 10:
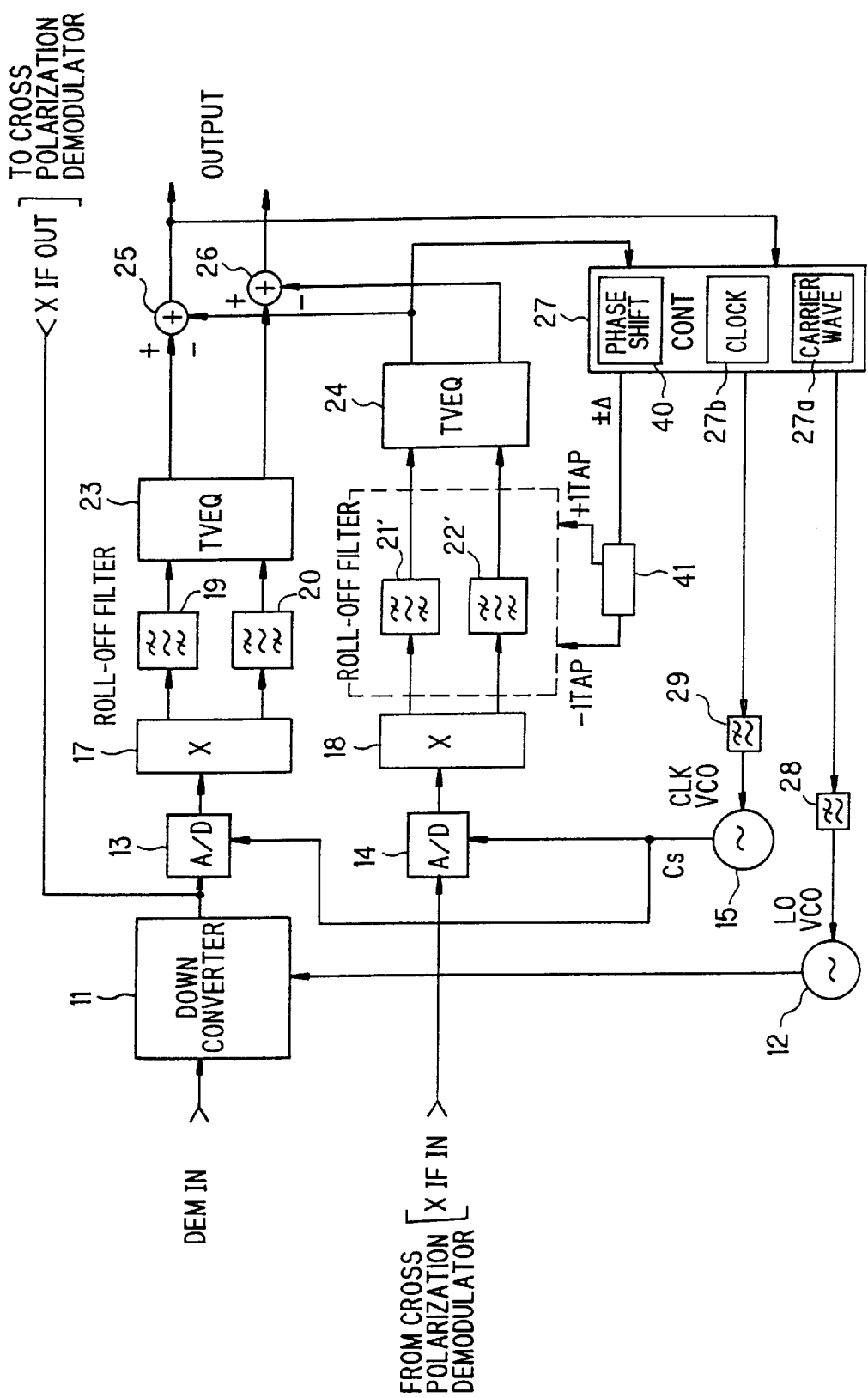
FIG. 10 is a diagram showing the construction of a demodulator according to a third embodiment of the present invention.

FIG. 10 is a diagram showing the construction of a demodulator according to a third embodiment of the present invention. Elements identical with those of the second embodiment in FIG. 8 are designated by like reference characters.

As shown in FIG. 10, the demodulator includes a phase-shift direction controller 40 which outputs ±Δ depending upon the phase shift direction, and a tap coefficient decision unit 41 for deciding a −1 tap coefficient C−1 and a +1 tap coefficient C1 of the roll-off filters 21, 22.

Figure 11:
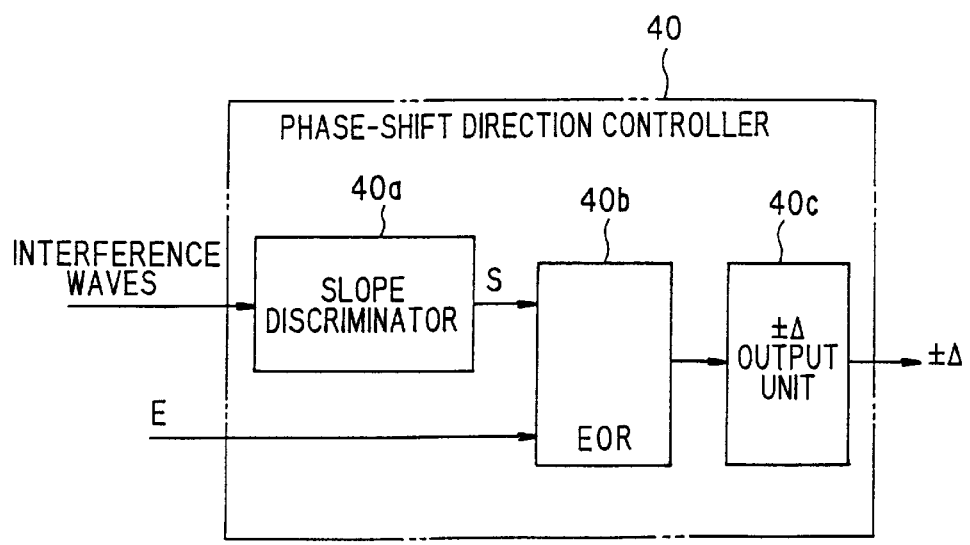
FIG. 11 is a diagram showing a phase-shift direction controller.
Figure 12:
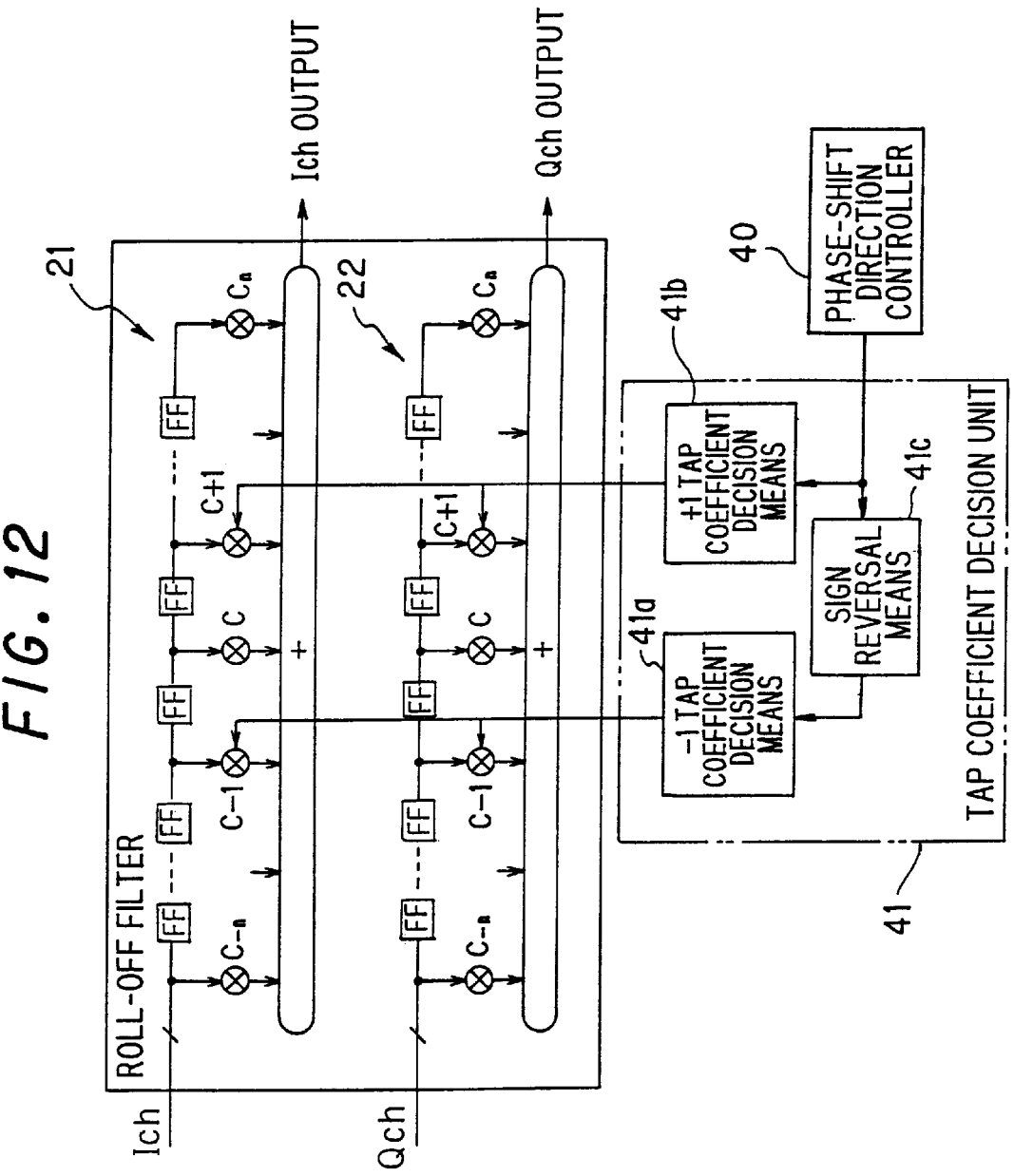
FIG. 12 is a diagram showing the construction of the principal components of the third embodiment.
Figure 13:
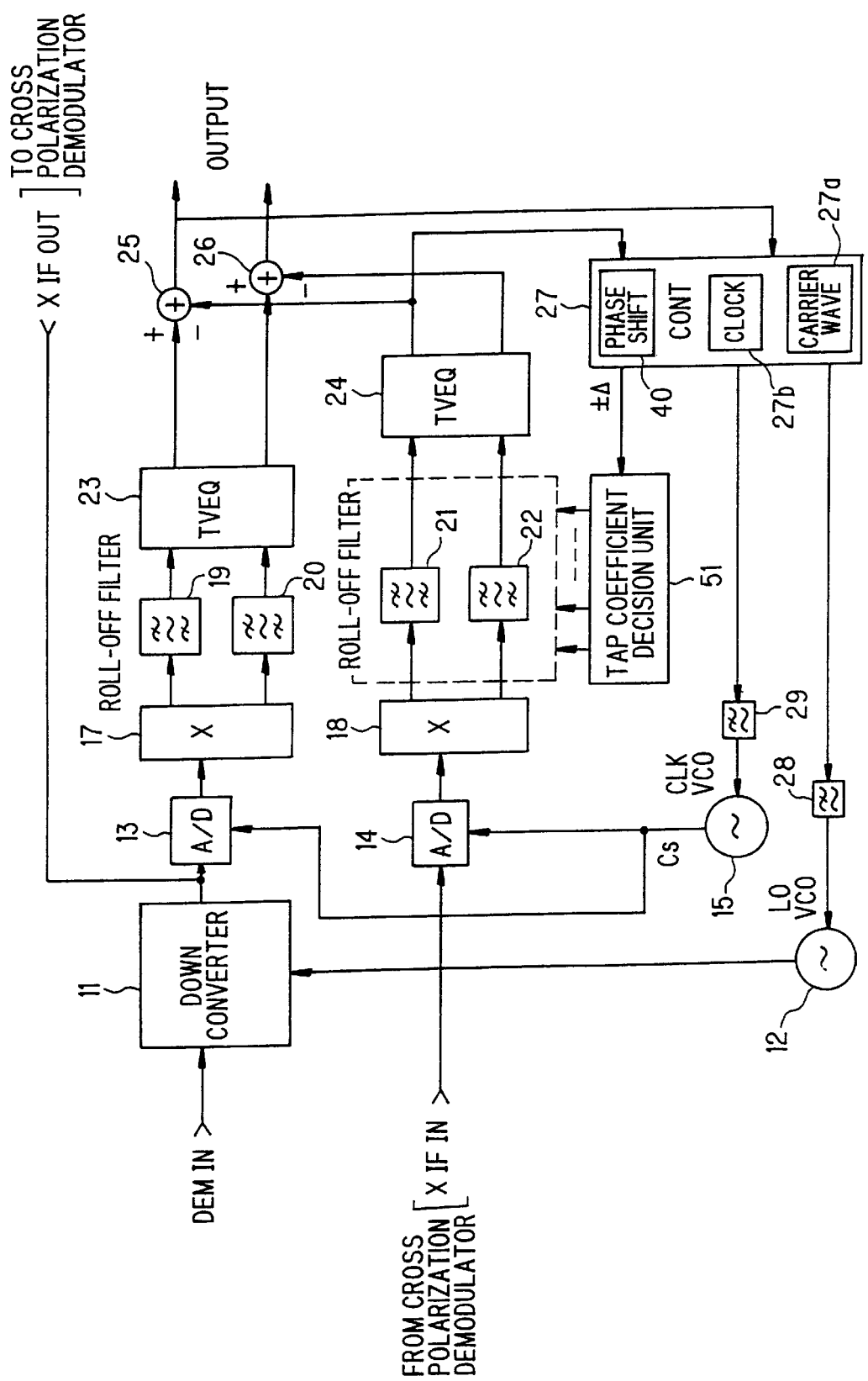
FIG. 13 is a diagram showing the construction of a demodulator according to a fourth embodiment of the present invention.

As shown in FIG. 11, the phase-shift direction controller 40 includes a slope discriminator 40a for discriminating the slope S of the interference waves, an EOR circuit 40b for executing an exclusive-OR operation between the third bit (error bit) E of the main polarization I-channel signal and the slope S, and a ±Δ output circuit 40c for outputting +Δ or −Δ in accordance with the result of the exclusive-OR operation. As shown in FIG. 12, the tap coefficient decision unit 41 includes −1 tap coefficient decision means 41a for deciding the −1 tap coefficient $C_{-1}$ of the roll-off filters 21, 22, +1 tap coefficient decision means 41b for deciding the +1 tap coefficient $C_1$ of the roll-off filters 21, 22, and sign reversal means 41c.

As described in connection with FIG. 6, it is necessary to delay the phase of the interference waves if the result of the exclusive-OR performed by the EOR circuit 40b (FIG. 11) is "1" and to advance the phase of the interference waves if the result of the exclusive-OR operation is "0". On the other hand, in regard to the 3-tap FIR filter where n=1, the +1 coefficient value $C_1$ should be changed in the positive direction (see FIG. 5B) and the −1 tap coefficient value $C_{-1}$ should be changed in the negative direction to delay the phase of the input signal. In order to advance the phase of the input signal, the +1 coefficient value $C_1$ should be changed in the negative direction (see FIG. 5C) and the −1 tap coefficient value $C_{-1}$ should be changed in the positive direction.

The foregoing may be summarized as shown in the following table.

TABLE 1

| Result of Ex-Or | +1 Tap Coefficient $C_1$ | −1 Tap Coefficient $C_{-1}$ |
| --- | --- | --- |
| "1" (delay phase shift) | Positive (+Δ) | Negative (−Δ) |
| "0" (advance phase shift) | Negative (−Δ) | Positive (+Δ) |

Accordingly, the phase-shift direction controller 40 enters +Δ into the +1 tap coefficient decision means 41b and enters −Δ into the −1 tap coefficient decision means 41a via the sign reversal unit 41c if the result of ex-OR operation is "1" (phase delay). Further, the phase-shift direction controller 40 enters −Δ into the +1 tap coefficient decision means 41b and enters +Δ into the −1 tap coefficient decision means 41a via the sign reversal unit 41c if the result of ex-OR operation is "0" (phase advance).

When the phase-shift direction controller 40 outputs +Δ, the −1 tap coefficient decision means 41a reduces the coefficient $C_{-1}$ by Δ and the +1 tap coefficient decision means 41b increases the coefficient $C_1$ by Δ and sets the coefficients in the roll-off filters 21, 22. As a result, the phase of the interference waves is delayed. When the phase-shift direction controller 40 outputs −Δ, the −1 tap coefficient decision means 41a increases the coefficient $C_{-1}$ by Δ and the +1 tap coefficient decision means 41b decreases the coefficient $C_1$ by Δ and sets the coefficients in the roll-off filters 21, 22. As a result, the phase of the interference waves is advanced.

(b) Operation

The error bit E of the main polarization demodulated signal (the I-channel signal) and the interference wave signal enter the phase-shift direction controller 40 of the control circuit 27 from the subtractor 25 and transversal equalizer 24, respectively. The phase-shift direction controller 40 takes the exclusive-OR of the error bit E and the slope S of the interference waves, judges the phase shift direction based upon the results of the ex-OR operation and outputs ±Δ in dependence upon the shift direction (see Table 1).

When the phase-shift direction controller 40 outputs +Δ to delay the phase of the interference waves, the −1 tap coefficient decision means 41a decreases the coefficient $C_{-1}$ by Δ, the +1 tap coefficient decision means 41b increases the coefficient $C_1$ by Δ and sets the coefficients in the roll-off filters 21, 22. The phase of the interference waves is delayed as a result.

When the phase-shift direction controller 40 outputs −Δ to advance the phase of the interference waves, the −1 tap coefficient decision means 41a increases the coefficient $C_{-1}$ by Δ, the +1 tap coefficient decision means 41b decreases the coefficient $C_1$ by Δ and sets the coefficients in the roll-off filters 21, 22. The phase of the interference waves is advanced as a result.

The foregoing operation is repeated so that the coefficients $C_{-1}$, $C_1$ each converge. The phase difference between the interference signal and the demodulated signal of main polarization becomes substantially zero and the interference component contained in the demodulated signal of main polarization is canceled correctly.

(E) Fourth Embodiment

The third embodiment relates to a case in which the phase of the interference waves is controlled by controlling two values, namely the −1 tap coefficient $C_{-1}$ and the +1 tap coefficient $C_1$ of the roll-off filters 21, 22. However, accuracy can be improved by controlling the coefficients of other taps as well.

The fourth embodiment relates to a case in which the phase of the interference waves is controlled by controlling the values of a number of tap coefficients $C_{\pm 1}$, $C_{\pm 2}$, ... This embodiment differs from the third embodiment of FIG. 10 in that a tap coefficient decision unit 51 decides the values of a number of tap coefficients $C_{\pm 1}$, $C_{\pm 2}$, ... and sets the values in the roll-off filters 21, 22.

As will be apparent from FIGS. 5B and 5C, the polarity of the coefficient $C_2$ of the +2 tap is the opposite of the polarity of the coefficient $C_1$ of the +1 tap, the polarity of the coefficient $C_3$ of the +3 tap is the opposite of the polarity of the coefficient $C_2$ of the +2 tap, and so on with regard to the succeeding taps, regardless of whether phase is advanced or delayed. Similarly, the polarity of the coefficient $C_{-2}$ of the −2 tap is the opposite of the polarity of the coefficient $C_{-1}$ of the −1 tap, the polarity of the coefficient $C_{-3}$ of the −3 tap is the opposite of the polarity of the coefficient $C_{-2}$ of the −2 tap, and so on with regard to the succeeding taps, regardless of whether phase is advanced or delayed.

Further, the tap coefficients decrease the more distant they are from the center tap and therefore accurate control can not be carried out merely by changing polarity. Accordingly, multiplication is performed using the rates $\alpha_{+1}$, $\alpha_{-1}$; $\alpha_{+2}$, $\alpha_{-2}$; ... at which the tap coefficients decrease the more distant they are from the center tap. If multiplication is carried out accurately, greater accuracy is obtained. However, if rounding off to values (e.g. ½, ¼, ...) which require less hardware for the bit operations is carried out, the amount of hardware can be reduced.

Figure 14:
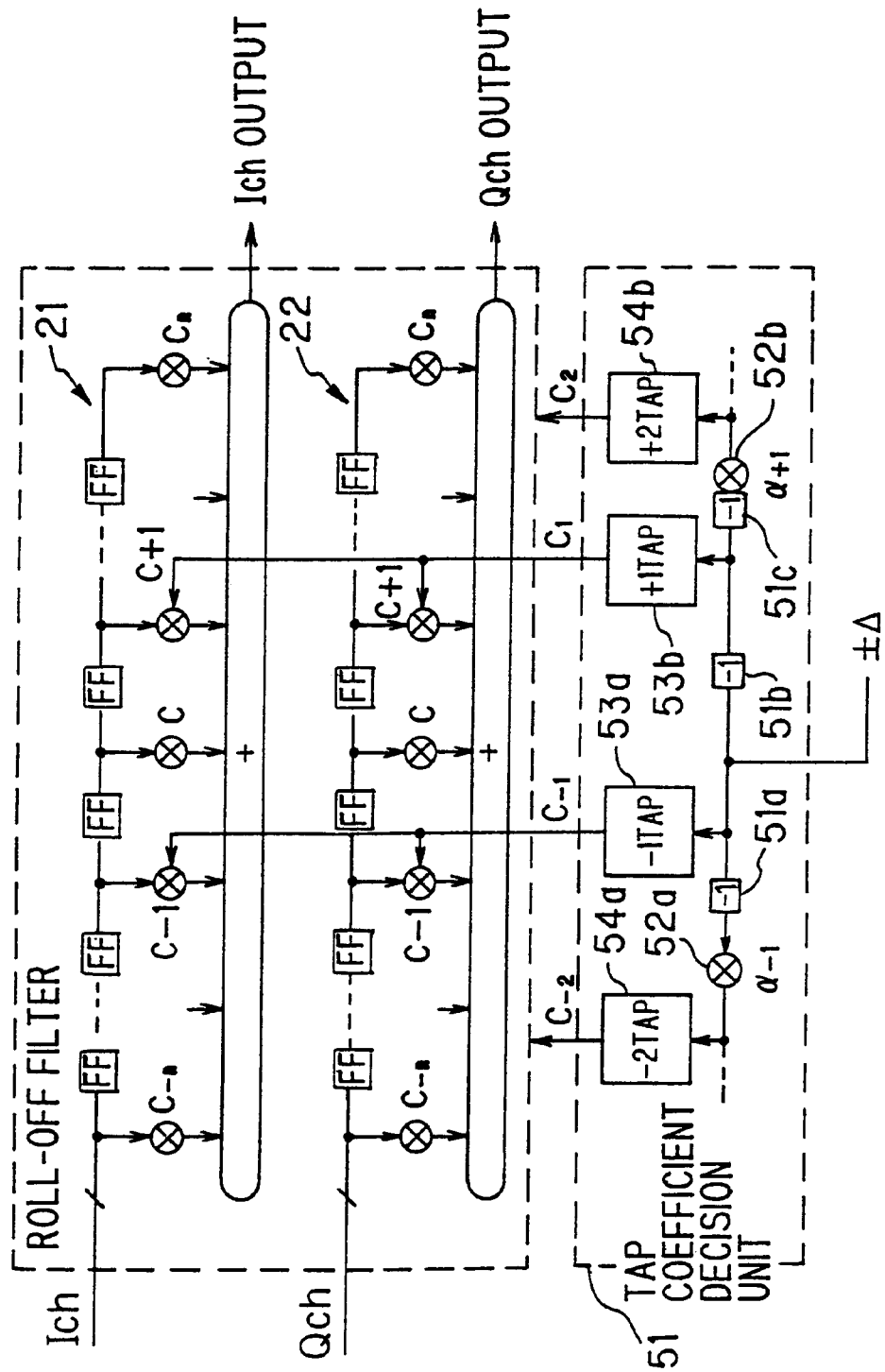
FIG. 14 is a diagram showing the construction of a tap coefficient decision unit.
Figure 15:
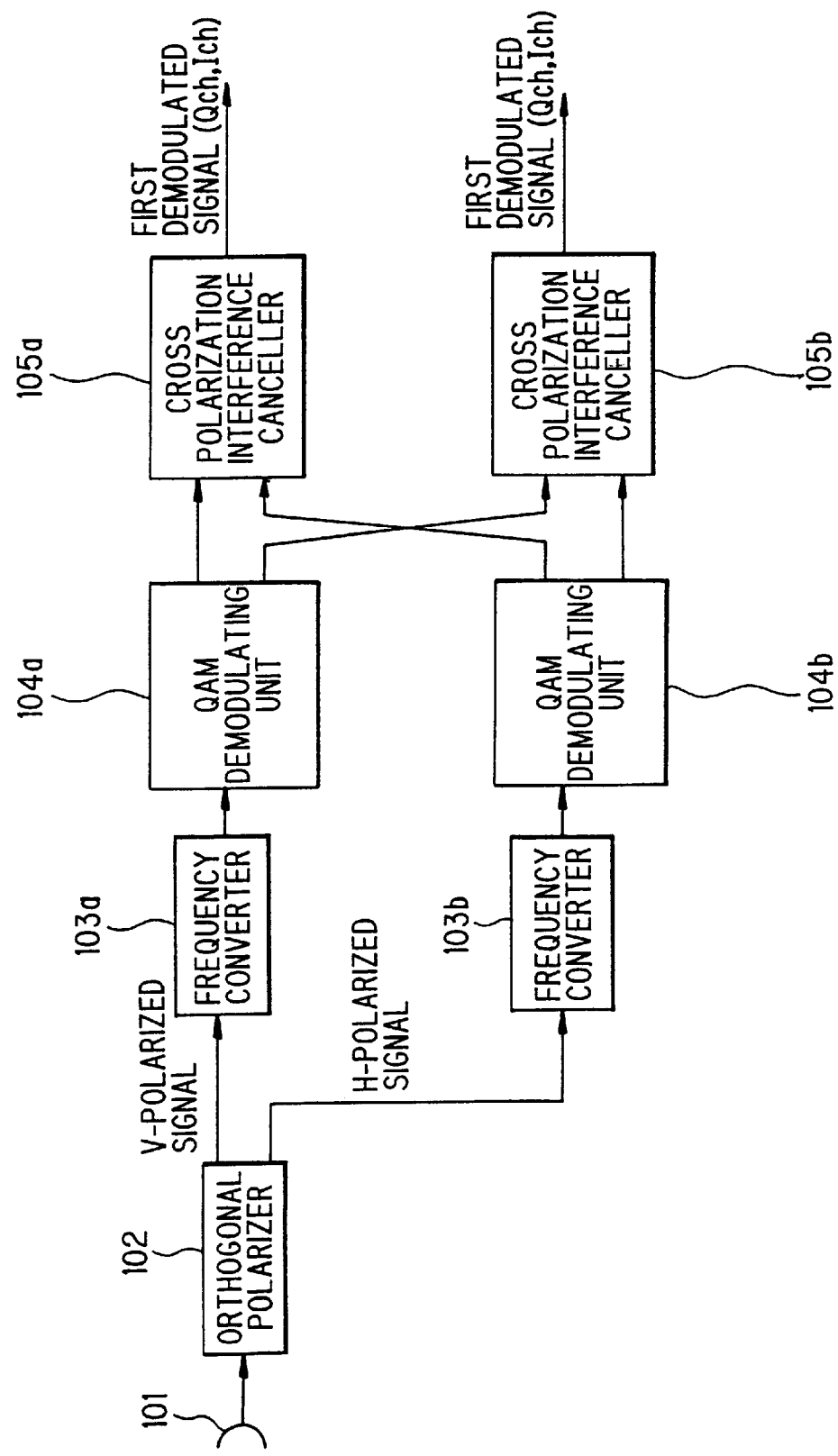
FIG. 15 is a block diagram showing the construction of the receiving section of a transmission apparatus making joint use of orthogonal polarized waves.
Figure 16:
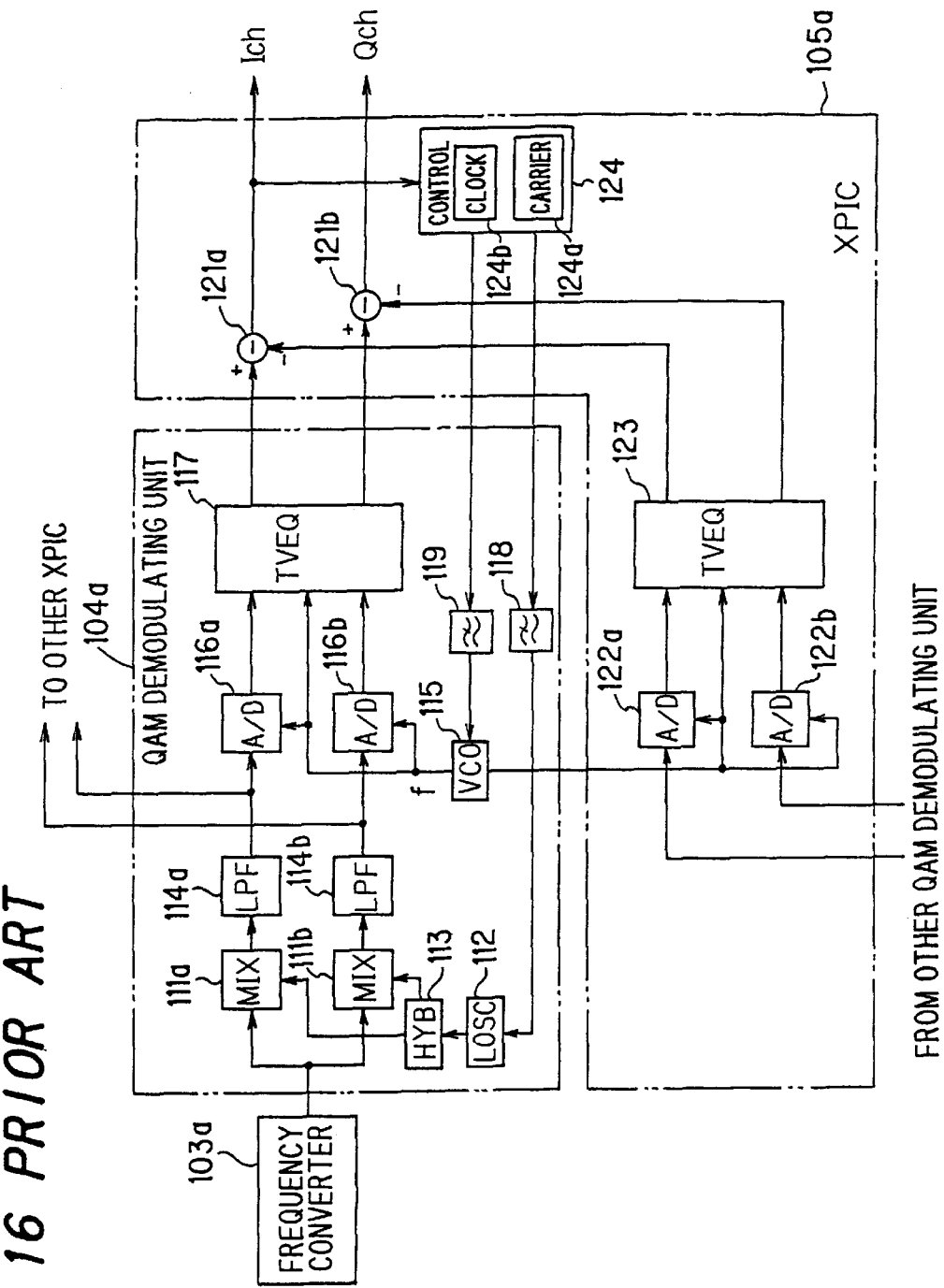
FIG. 16 is a block diagram showing a QAM demodulating unit and an XPIC.
Figure 17:
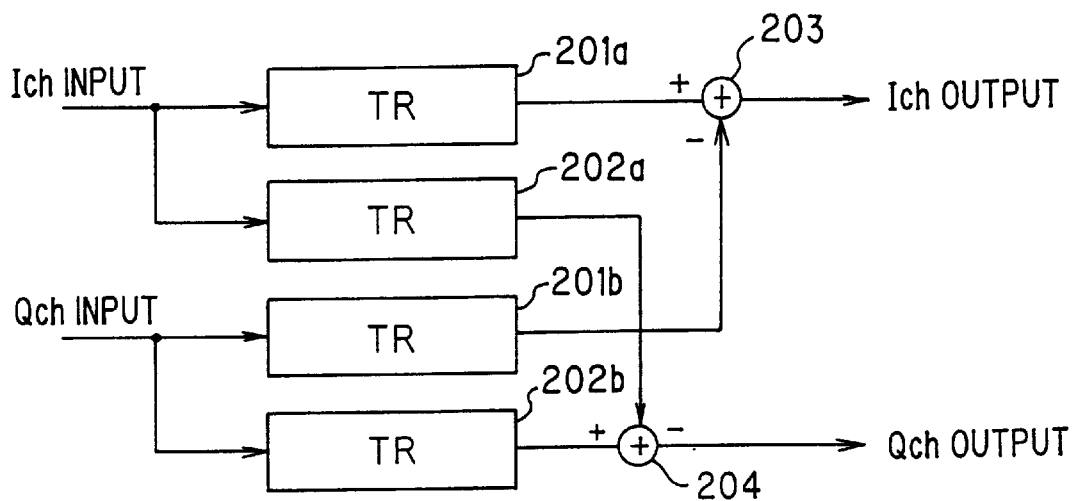
FIG. 17 is a diagram showing the construction of a transversal equalizer.
Figure 18:
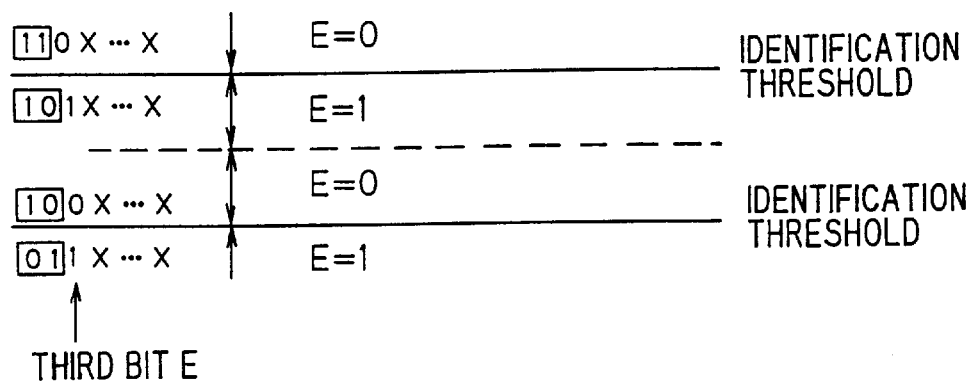
FIG. 18 is a diagram showing the relationship between identification threshold values and digital data.
Figure 19:
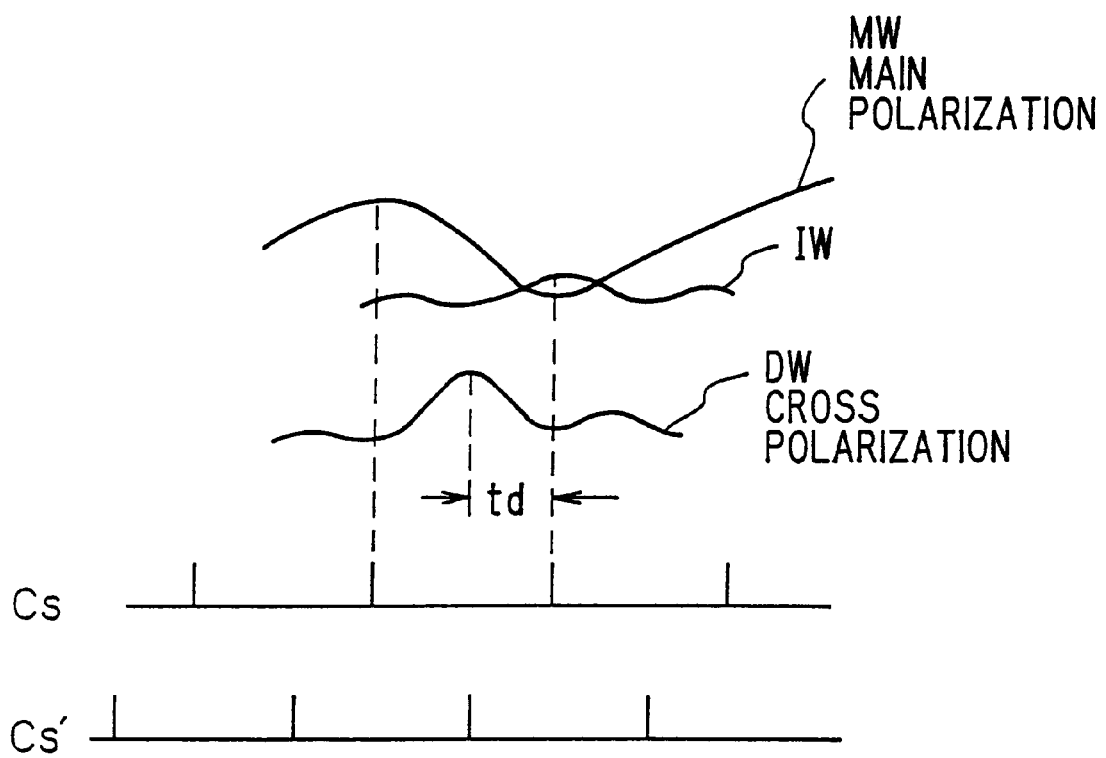
FIG. 19 is a diagram useful in describing phase control of a sampling clock.
Figure 20:
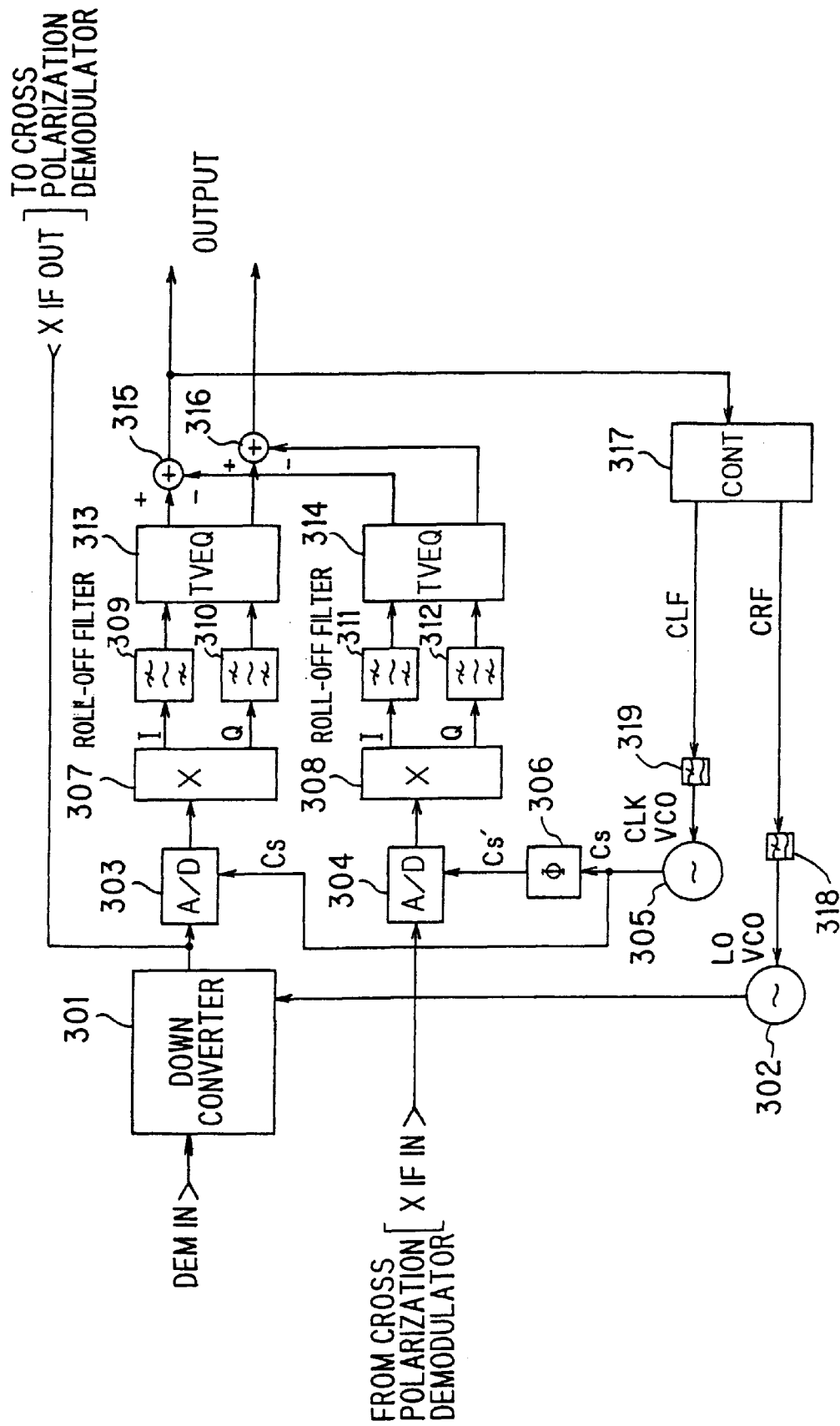
FIG. 20 is a demodulator provided on the side of main polarization and equipped with a phase adjuster.
Figure 21:
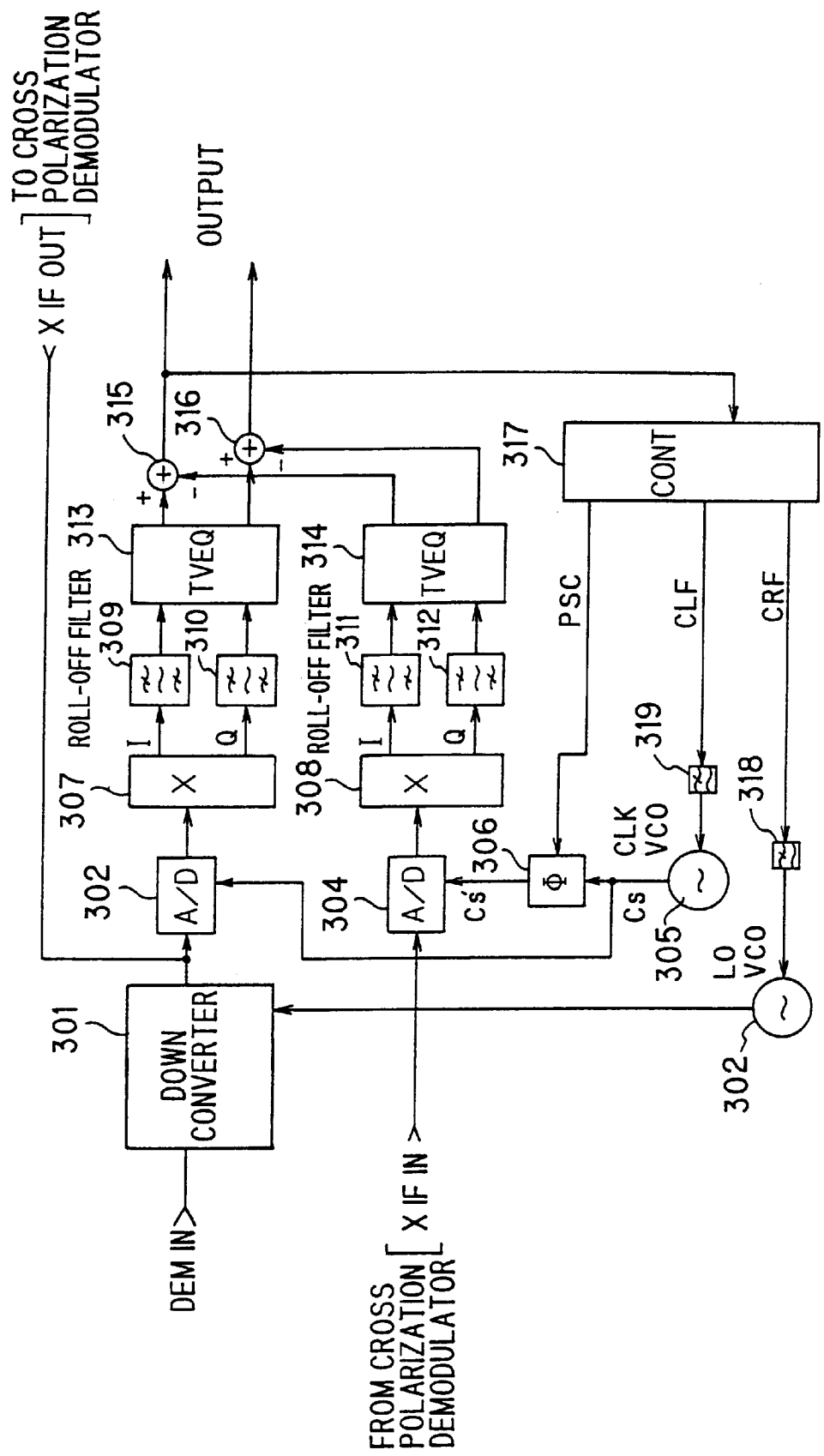
FIG. 21 is a demodulator provided on the side of main polarization and equipped with an automatic phase adjustment function.

FIG. 14 is a diagram showing the construction of the tap coefficient decision unit 51. The latter includes polarity reversal means 51a, 51b, 51c, multipliers 52a, 52b for multiplying by the increase/decrease rates $\alpha_{+1}$, $\alpha_{-1}$, respectively, −1 tap coefficient decision means 53a, +1 tap coefficient decision means 53b, −2 tap coefficient decision means 54a and +2 tap coefficient decision means 54b. The −1 tap coefficient decision means 53a adds/subtracts ±Δ output by the phase-shift direction controller 40 and outputs the −1 tap coefficient $C_{-1}$. The +1 tap coefficient decision means 53b adds/subtracts the value obtained by reversing the polarity of ±Δ output by the phase-shift direction controller 40 and outputs the +1 tap coefficient $C_1$. The −2 tap coefficient decision means 54a adds/subtracts the output ±Δ of the phase-shift direction controller 40 upon multiplying the same by $-\alpha_1$ and outputs the −2 tap coefficient $C_{-2}$. The +2 tap coefficient decision means 54b adds/subtracts the output ±Δ of the phase-shift direction controller 40 upon multiplying the same by $\alpha_{+1}$ and outputs the +2 tap coefficient $C_2$. The remaining ±n tap coefficients $C_{\pm n}$ can be obtained in similar fashion.

(F) Modification

In the first embodiment, the correspondence between phase θ and coefficient values is stored in the memory MM in advance and the coefficient setting unit 30 (FIG. 3) subsequently reads coefficient values, which correspond to the phase θ entered from the phase calculating circuit 27c, out of the memory and sets the coefficients in the phase shifter 16. However, the memory MM for storing the coefficient values corresponding to phase θ is required. Accordingly, an arrangement may be adopted in which, in a manner similar to that of the third and fourth embodiments, a tap coefficient deciding unit is provided, tap coefficient values are decided by a similar method using the tap coefficient deciding unit and coefficient values are set in the phase shifter 16.

Thus, in accordance with the present invention as described above, the phase of the interference signal is controlled rather instead of changing the phase of the sampling clock. This means that changing over the clock is not required. Even if the phase difference between the main polarized wave signal and the interference signal is large, phase is adjusted reliably to increase cross polarization interference canceling performance.

Further, according to the present invention, the phase shifter is constituted by a (2n+1) tap FIR-type digital filter the coefficients of which can be changed. The phase of the interference signal is controlled by changing the coefficient value of each tap in dependence upon phase. This means that the invention can be applied to a demodulator having a digital construction. Phase adjustment can be carried out with ease by storing the correspondence between the amount of phase adjustment and the coefficient value of each tap in memory beforehand.

Further, according to the present invention, each tap coefficient value of the roll-off filters of the demodulator is controlled so as to obtain a predetermined amount of phase adjustment of the interference signal and to obtain a desired roll-off characteristic. This makes it possible to dispense with the phase shifter and hold down an increase in hardware.

Further, according to the present invention, it suffices to control a total of 2n (n≧1) tap coefficients composed of tap coefficients from both sides the center tap. Moreover, the phase of the interference signal can be adjusted merely by increasing or decreasing each tap coefficient a predetermined amount depending upon phase delay or phase advance. As a result, when phase is adjusted, it is unnecessary to store the correspondence between amount of phase adjustment and the coefficient value of each tap in memory, thus making it possible to suppress an increase in amount of hardware. In particular, the increase in amount of hardware when m=1 holds can be kept very small.

As many apparently widely different embodiments of the present invention can be made without departing from the spirit and scope thereof, it is to be understood that the invention is not limited to the specific embodiments thereof except as defined in the appended claims.

What is claimed is:

1. A demodulator having a cross polarization interference canceling function for canceling interference of cross polarization in main polarization, comprising:
a demodulating unit for demodulating a baseband signal of main polarization;
an interference cancellation unit for canceling an interference signal component from a demodulated signal of main polarization; and
phase control means for controlling phase of an interference signal, which is a baseband signal of cross polarization,
wherein said phase control means includes:
a digital filter operating as a phase shifter;
a phase calculating means for calculating a phase difference between said demodulated signal of main polarization and said interference signal of cross polarization and for deciding whether to delay or advance the phase of the interference signal based upon said phase difference; and
a coefficient value control unit for increasing a tap coefficient of a tap on an output side and decreasing a tap coefficient of a tap on an input side of a center tap of said digital filter in a case where the phase of the interference signal is delayed, and for decreasing a tap coefficient of the tap on the output side and increasing a tap coefficient of the tap on the input side of the center tap of said digital filter in a case where the phase of the interference signal is advanced.

2. A demodulator having a cross polarization interference canceling function for canceling interference of cross polarization in main polarization, comprising:
a demodulating unit for demodulating a baseband signal of main polarization;
an interference cancellation unit for canceling an interference signal component from a demodulated signal of main polarization; and
phase control means for controlling phase of an interference signal, which is a baseband signal of cross polarization,
wherein said phase control means includes:
a digital filter operating as a phase shifter;
a phase advance/delay decision unit for deciding whether to delay or advance the phase of the interference signal; and
a coefficient value control unit for controlling coefficient values of a phase shifter, wherein;
in a case where the phase of the interference signal is delayed, said coefficient value control unit increases values of a first group of tap coefficients of alternate taps on an output side of a center tap of said phase shifter, decreases values of a second group of tap coefficients of alternate taps on the output side of the center tap, decreases values of a first group of tap coefficients of alternate taps on an input side of the center tap and increases values of a second group of tap coefficients of alternate taps on the input side of the center tap, the taps being from among a total of 2m taps (where m is an integer equal to or greater than 2) composed of m taps from each side of the center tap; and
in a case where the phase of the interference signal is advanced, said coefficient value control unit decreases values of the first group of tap coefficients of alternate taps on the output side of the center tap of the phase shifter, increases values of the second group of tap coefficient of alternate taps on the output side of the center tap, increases values of the input side of the center tap and decreases values of the second group of tap coefficients of alternate taps on the input side of the center tap.

3. The demodulator according to claim 2, wherein the farther a tap is from the center tap, the smaller the percentage of increase or decrease in the coefficient value of the tap is made.

4. A demodulator having a cross polarization interference canceling function for canceling interference of cross polarization in main polarization, comprising:
a demodulating unit for demodulating a baseband signal of main polarization;
an interference cancellation unit for canceling an interference signal component from a demodulated signal of main polarization;
a first digital roll-off filter for imparting the demodulated signal of main polarization with roll-off characteristics;
a second digital roll-off filter for imparting an interference signal which is a baseband signal of cross polarization with roll-off characteristics; and
phase control means for controlling a phase of said interference signal;
wherein said phase control means includes:
a phase calculating means for calculating a phase difference between said demodulated signal of main polarization and said interference signal of cross polarization and for deciding whether to delay or advance said phase of the interference signal based upon said phase difference, and
a coefficient value control unit for increasing a tap coefficient of a tap on an output side and decreasing a tap coefficient of a tap on an input side of a center tap of said second digital roll-off filter in a case where the phase of the interference signal is delayed, and for decreasing a tap coefficient of the tap on the output side and increasing a tap coefficient of the tap on the input side of the center tap of said second digital roll-off filter in a case where said phase of said interference signal is advanced.

5. The demodulator according to claim 4, wherein said phase calculating means includes:
a slope discriminator for discriminating slope S of said interference signal,
a phase-shift direction discriminator for deciding whether to delay or advance the phase of the interference signal based upon an error bit E of said demodulated signal of main polarization and said slope S of the interference signal; and
a counter for calculating said phase difference by counting up when the output signal of the phase-shift direction discriminator indicates advance direction and counting down when the output signal of the phase-shift direction discriminator indicates delay direction.

6. A demodulator having a cross polarization interference canceling function for canceling interference of cross polarization in main polarization, comprising:
- a demodulating unit for demodulating a baseband signal of main polarization;
- an interference cancellation unit for canceling an interference signal component from a demodulated signal of main polarization;
- first and second digital roll-off filters for imparting the demodulated signal of main polarization and an interference signal with roll-off characteristics; and
- phase control means for controlling coefficients of the second roll-off filter for the interference signal in dependence upon a phase imparted to the interference signal so that a phase difference between said demodulated signal of main polarization and said interference signal of cross polarization is zero, wherein said phase control means includes:
  - a phase advance/delay decision unit for deciding whether to delay or advance the phase of the interference signal; and
  - a coefficient value control unit for controlling coefficient values of the second roll-off filter, wherein:
    - in a case where the phase of the interference signal is delayed, said coefficient value control unit increases values of a first group of tap coefficients of alternate taps on an output side of a center tap of the second roll-off filter, decreases values of a second group of tap coefficients of alternate taps on the output side of the center tap, decreases values of a first group of tap coefficients of alternate taps on an input side of the center tap and increases values of a second group of tap coefficients of alternate taps on the input side of the center tap, the taps being from among a total of 2m taps (where m is an integer equal to or greater than 2) composed of m taps from each side of the center tap; and
    - in a case where the phase of the interference signal is advanced, said coefficient value control unit decreases values of the first group of tap coefficients of alternate taps on the output side of the center tap of the roll-off filter, increases values of the second group of tap coefficients of alternate taps on the output side of the center tap, increases values of the first group of tap coefficients of alternate taps on the input side of the center tap and decreases values of the second group of tap coefficients of alternate taps on the input side of the center tap.

7. The demodulator according to claim 6, wherein the farther a tap is from the center tap, the smaller the percentage of increase or decrease in the coefficient value of the tap is made.

8. A demodulator having a cross polarization interference canceling function for canceling interference of cross polarization in main polarization, comprising:
- a demodulating unit for demodulating a baseband signal of main polarization;
- an interference cancellation unit for canceling an interference signal component from a demodulated signal of main polarization; and
- phase control means for controlling phase of an interference signal, which is a baseband signal of cross polarization, wherein said phase control means includes:
- a digital filter operating as a phase shifter;
- a phase calculating means for calculating a phase difference between said demodulated signal of main polarization and said interference signal of cross polarization and for deciding whether to delay or advance the phase of the interference signal based upon said phase difference; and
- a coefficient value control unit for increasing a tap coefficient of a tap on an output side and decreasing a tap coefficient of a tap on an input side of a center tap of said digital filter in a case where the phase of the interference signal is delayed, and for decreasing a tap coefficient of the tap on the output side of the center tap of said digital filter in a case where the phase of the interference signal is advanced, wherein said phase calculating means includes:
- a slope discriminator for discriminating slope S of said interference signal,
- a phase-shift direction discriminator for deciding whether to delay or advance the phase of the interference signal based upon an error bit E of said demodulated signal of main polarization and said slope S of the interference signal; and
- a counter for calculating said phase difference by counting up when the output signal of the phase-shift direction discriminator indicates advance direction and counting down when the output signal of the phase-shift direction discriminator indicates delay direction.

9. A demodulator having a cross polarization interference canceling function for canceling interference of cross polarization in main polarization, comprising:
- a demodulating unit for demodulating a baseband signal of main polarization;
- an interference cancellation unit for canceling an interference signal component from a demodulated signal of main polarization;
- first and second digital roll-off filters connected to the interference cancellation unit, for imparting the demodulated signal of main polarization and an interference signal with roll-off characteristics; and
- phase control means for controlling phase of the interference signal, which is a baseband signal of cross polarization, wherein said phase control means includes:
- a digital filter operating as a phase shifter for shifting phase of the interference signal supplied to the second roll-off filter;
- a phase calculating means for calculating a phase difference between said demodulated signal of main polarization and said interference signal of cross polarization and for deciding whether to delay or advance the phase of the interference signal based upon said phase difference; and
- a coefficient value control unit for increasing a tap coefficient of a tap on an output side and decreasing a tap coefficient of a tap on an input side of a center tap of said digital filter in a case where the phase of the interference signal is delayed, and for decreasing a tap coefficient of the tap on the output side of the center tap of said digital filter in a case where the phase of the interference signal is advanced.

* * * * *